Figure 1:
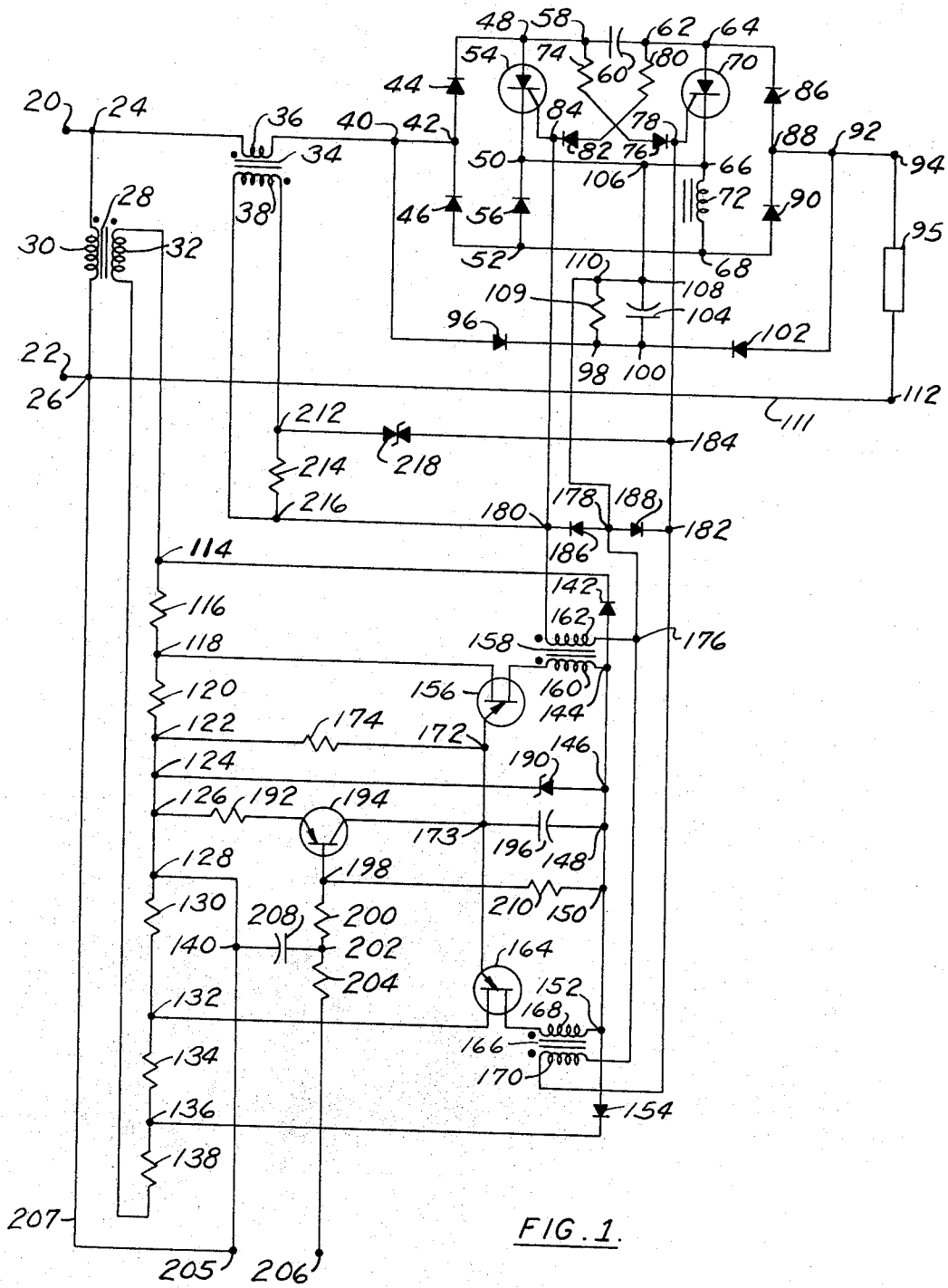

INVENTOR.
OWEN E. REINERT
BY Rey Eilers
ATTORNEY.

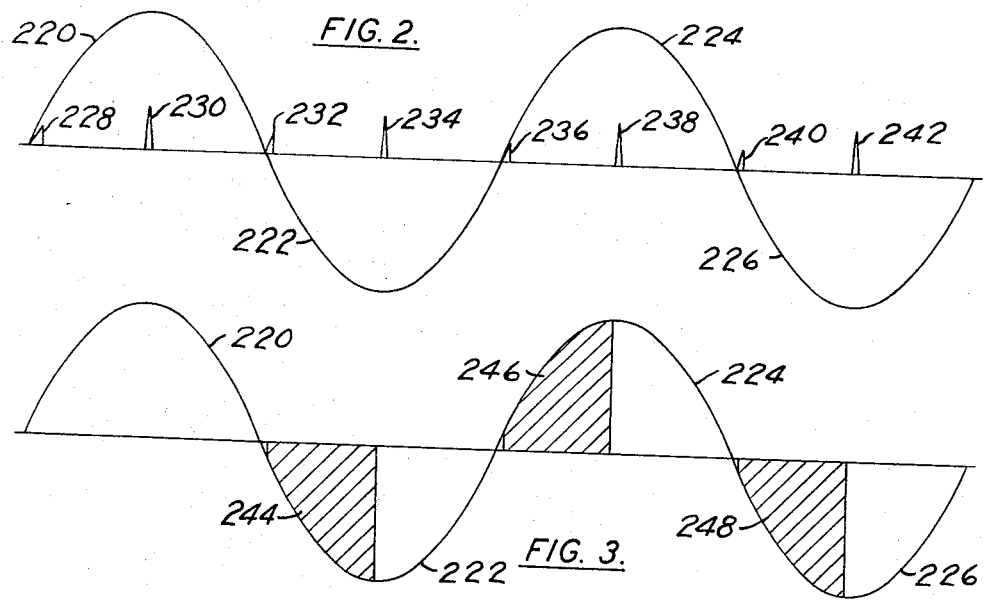
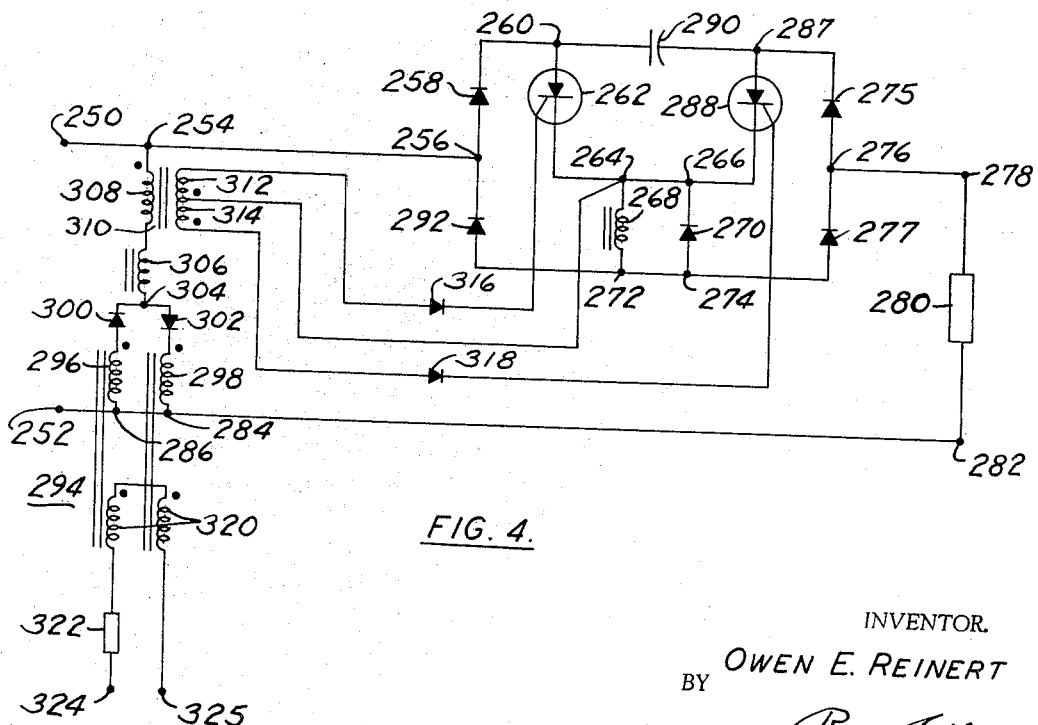

INVENTOR.
OWEN E. REINERT
BY Rey Eilers
ATTORNEY.

United States Patent Office 3,335,360
Patented Aug. 8, 1967

3,335,360
A.C. CONTROL SYSTEMS FOR PROVIDING VARIABLE HALF-CYCLE POWER PULSES
Owen E. Reinert, St. Louis County, Mo., assignor to Sperry Rand Corporation, a corporation of Delaware
Filed Aug. 9, 1962, Ser. No. 215,984
17 Claims. (Cl. 323—22)

This invention relates to improvements in control systems. More particularly, this invention relates to improvements in control systems that can control the supplying of power to loads.

It is, therefore, an object of the present invention to provide an improved control system that can control the supplying of power to a load.

It would be desirable to be able to provide a full and prompt control of the supplying of power to a load; and, in recognition of that fact, a number of control systems have been proposed which were intended to provide full and prompt control of the supplying of power to loads. A number of those control systems relied upon control elements, such as controlled rectifiers, which could be "fired" during the alternating half-cycles of an A.C. supply and which would then supply power to loads throughout the remainders of those half-cycles. By varying the "firing angles" of those control elements, those control systems were able to vary the durations of the periods during which power was supplied to the loads; and hence those control systems were able to control the total amount of power supplied to those loads. However, once the control elements of those control systems were rendered conductive, those control elements remained conductive throughout the remaining portions of the half-cycles of the A.C. supply; and those control systems could not turn those control elements "off" prior to the ends of those half-cycles. Yet, in some instances, it would be important to turn those control elements "off" prior to the ends of the half-cycles of the A.C. supply. Consequently, it would be desirable to provide a control system which relied upon control elements, such as controlled rectifiers, that could be turned "off" prior to the ends of half-cycles, of an A.C. supply, during which they were supplying power to a load. The present invention provides such a control system; and it is, therefore, an object of the present invention to provide a control system which relies upon control elements, such as controlled rectifiers, that can be turned "off" prior to the ends of half-cycles, of an A.C. supply, during which they are supplying power to a load.

The control system provided by the present invention has a capacitor which is charged during each half-cycle of the A.C. supply and which can selectively use the charge thereon to render the control elements of that control system non-conductive. Specifically, the control system provided by the present invention has a capacitor which is charged with one terminal thereof positive while one of the control elements of that control system is conducting current; and that control system subsequently uses that charge on that capacior to cause inverse current to flow through that control element, and thereby render that control element non-conductive, as a second control element of that control system becomes conductive. Similarly, that capacitor is charged with the opposite terminal thereof positive while that other control element is conducting current; and that control system subsequently uses that charge on that capacitor to cause inverse current to flow through that other control element, and thereby render that other control element non-conductive, as the first control element becomes conductive. In addition, the control system provided by the present invention causes the A.C. supply to force the capacitor to charge in the opposite direction whenever that capacitor has caused an inverse current to flow through either of the control elements of that control system and has thus rendered that control element non-conductive. This is desirable because the A.C. supply will assure prompt charging of that capacitor in the opposite direction. It is, therefore, an object of the present invention to provide a capacitor which can use the charge thereon to cause inverse current to flow through the control elements of that control system prior to the ends of the half-cycles during which those control elements are to connect the A.C. supply to the load.

The control elements of the control system provided by the present invention can be turned "off" at predetermined points during the half-cycles of the A.C. supply, can be turned "off" in response to changes associated with the load, or can be selectively turned "off" at predetermined points during the half-cycles of the A.C. supply or in response to changes associated with the load. Where the control elements of the control system provided by the present invention are turned "off" at predetermined points during the half-cycles of the A.C. supply, precisely controlled amounts of power can be supplied to the load. Where the control elements of the control system provided by the present invention are turned "off" in response to changes associated with the load, the load can be protected against voltage overloads, current overloads, and other objectionable conditions. Where the control elements of the control system provided by the present invention are selectively turned "off" at predetermined points during the half-cycles of the A.C. supply or in response to changes associated with the load, precisely controlled amounts of power can, under all normal conditions, be supplied to the load, and reduced amounts of power can be supplied to the load during abnormal conditions. It is, therefore, an object of the present invention to provide a control system with control elements that can be turned "off" at predetermined points during the half-cycles of the A.C. supply, that can be turned "off" in response to changes associated with the load, and that can selectively be turned "off" at predetermined points during the half-cycles of the A.C. supply or turned "off" in response to changes associated with the load.

Other and further objects and advantages of the present invention should become apparent from an examination of the drawing and accompanying description.

In the drawing and accompanying description, several preferred embodiments of the present invention are shown and described but it is to be understood that the drawing and accompanying description are for the purpose of illustration only and do not limit the invention and that the invention will be defined by the appended claims.

Figure 5:
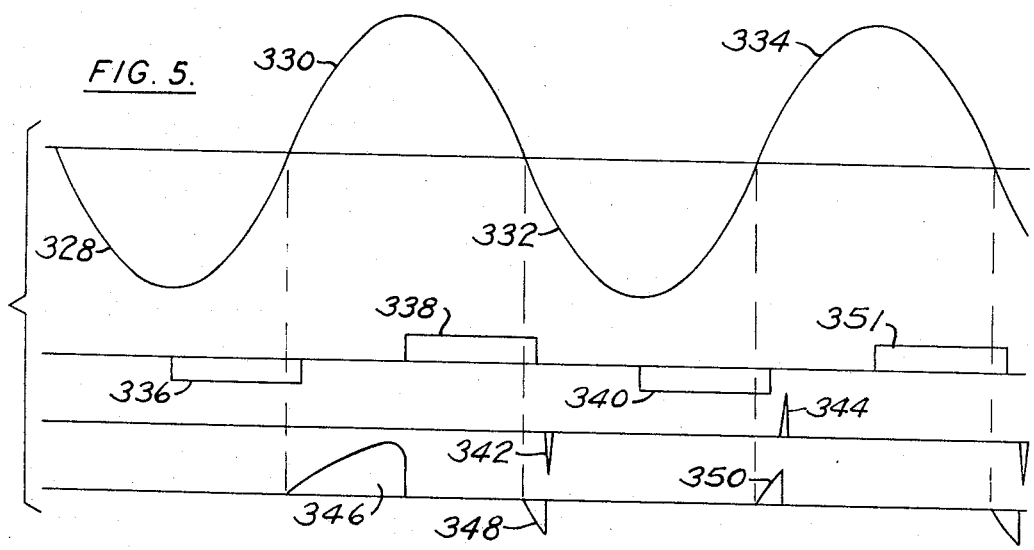
Figure 7:
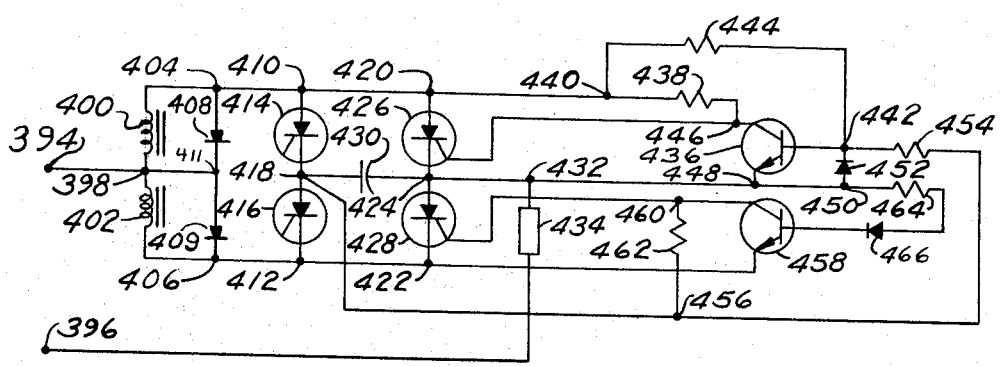
Figure 6:
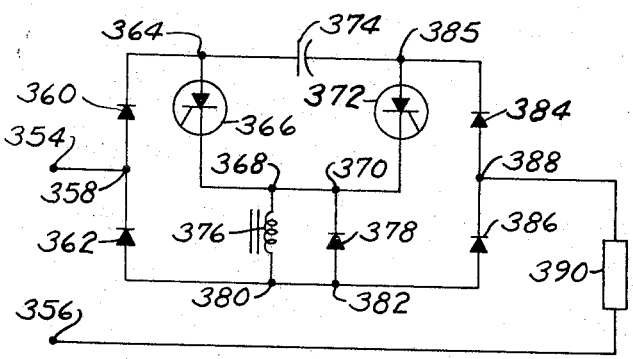

In the drawing,

FIG. 1 is a schematic diagram of one form of control system that is made in accordance with the principles and teachings of the present invention, FIG. 2 is a view of two cycles of an A.C. supply and of the "firing" signals supplied to the control elements of the control system of FIG. 1 during those cycles, FIG. 3 is a view of the pulses which the control system of FIG. 1 can supply to a load during two cycles of the A.C. supply, FIG. 4 is a schematic diagram of a second form of control system that is made in accordance with the principles and teachings of the present invention, FIG. 5 is a view of cycles of the A.C. supply connected to the control system of FIG. 4 and of signals and of power pulses provided by that control system during those cycles, FIG. 6 is a schematic diagram of the essential portion of the control systems of FIGS. 1 and 4, and FIG. 7 is a schematic diagram of a third form of control system that is made in accordance with the principles and teachings of the present invention.

Referring first to FIG. 1 in detail, the numerals 20 and 22 denote terminals which can be connected to a suitable source of A.C. power. Junctions 24 and 26 connect the primary winding 30 of a transformer 28 across those terminals; and the secondary winding of that transformer is denoted by the numeral 32. The winding 32 is wound so the upper end thereof is positive whenever the upper end of the primary winding 30 is positive.

The primary winding 36 of a current transformer 34, junctions 40 and 42, a diode 44, and a junction 48 connect the junction 24 with the anode of a controlled rectifier 54. The secondary winding of the current transformer 34 is denoted by the numeral 38; and that winding is wound so the right-hand end thereof will be positive whenever the left-hand end of the primary winding 36 is positive. Junctions 50, 106 and 66, inductor 72, junction 68, diode 90, and junctions 88 and 92 connect the cathode of the controlled rectifier 54 with a terminal 94 that can be connected to one side of a load 95. A conductor 111 extends between the junction 26 and a terminal 112 which can be connected to the other side of the said load.

The junctions 92 and 88, a diode 86, and a junction 64 connect the terminal 94 with the anode of a controlled rectifier 70. Junction 66, the inductor 72, junction 68, a junction 52, a diode 46, junctions 42 and 40, the primary winding 36 of the current transformer 34, and the junction 24 connect the cathode of the controlled rectifier 70 with the terminal 20. A capacitor 60 is connected to the junction 48 by a junction 58, and that capacitor is connected to the junction 64 by a junction 62. As a result, that capacitor is connected between the anodes of the controlled rectifiers 54 and 70. A diode 56 has the cathode thereof connected to the upper end of the inductor 72 by junctions 50, 106 and 66, and has the anode thereof connected to the lower end of that inductor by the junctions 52 and 68.

A resistor 74, a diode 76, and a junction 78 are connected between the junction 58 and the gate of the controlled rectifier 70. A resistor 80, a diode 82, and a junction 84 are connected between the junction 62 and the gate of the controlled rectifier 54.

A diode 96 has the anode thereof connected to the junction 40 and has the cathode thereof connected to the lower terminal of a capacitor 104 by junctions 98 and 100. A diode 102 has the anode thereof connected to the junction 92 and has the cathode thereof connected to the lower terminal of the capacitor 104 by the junction 100. The upper terminal of the capacitor 104 is connected to the junction 106 by a junction 108. A resistor 109 is connected in parallel with the capacitor 104 by junctions 98 and 100 and by junctions 110 and 108.

One terminal of the secondary winding 32 of the transformer 28 is connected to the upper terminal of a voltage divider by a junction 114; and that voltage divider includes resistors 116, 120, 130, 134 and 138. The lower terminal of that voltage divider is directly connected to the lower terminal of the secondary winding 32 of the transformer 28. The cathode of a diode 142 is connected to the junction 114, and the anode of that diode is connected to one terminal of a capacitor 196 by junctions 144, 146 and 148. The cathode of a diode 154 is connected to a junction 136 between the resistors 134 and 138, and the anode of that diode is connected to the said terminal of the capacitor 196 by junctions 152, 150 and 148.

A junction 118 between the resistors 116 and 120 is connected to base-two of a unijunction transistor 156. Base-one of that unijunction transistor is connected to the junction 144 by the primary winding 160 of a transformer 158. The secondary winding of the transformer 158 is denoted by the numeral 162; and that winding is wound so the left-hand end thereof will be positive whenever the left-hand end of the primary winding 160 is positive. The emitter of the unijunction transistor 156 is connected to the left-hand terminal of the capacitor 196 by junctions 172 and 173. A junction 132 between the resistors 130 and 134 is connected to base-two of a unijunction transistor 164. The base-one of that unijunction transistor is connected to the junction 152 by the primary winding 168 of a transformer 166. The secondary winding of the transformer 166 is denoted by the numeral 170; and that winding is wound so the left-hand end thereof will be positive whenever the left-hand end of the primary winding 168 is positive. The emitter of the unijunction transistor 164 is connected to the left-hand terminal of the capacitor 196 by the junction 173. A resistor 174 is connected between the junction 172 and a junction 122 between the resistors 120 and 130. A single Zener diode 190 is connected between the junction 146 and a junction 124 between the resistors 120 and 130.

A transistor 194 has the collector thereof connected to the junction 173 and has the emitter thereof connected to the junction 126, between the resistors 120 and 130, by a resistor 192. As a result, the emitter-collector circuit of the transistor 194 and the current-limiting resistor 192 are connected in parallel with the resistor 174. The base of the transistor 194 is connected to a terminal 206 by a junction 198, a resistor 200, a junction 202, and a resistor 204. The emitter of the transistor 194 is connected to a terminal 205 by the resistor 192 and by junctions 126, 128 and 140. A capacitor 208 is connected between the junctions 140 and 202. The terminal 205 also is connected to the junction 26 by a conductor 207. A resistor 210 is connected between the junction 198 and the junction 150.

One terminal of the secondary winding 162 of the transformer 158 is connected to the gate of the controlled rectifier 54 by junctions 180 and 84; and the other terminal of that secondary winding is connected to the cathode of that controlled rectifier by junctions 176, 178, 110, 108, 106 and 50. One terminal of the secondary winding 170 of the transformer 166 is connected to the gate of the controlled rectifier 70 by junctions 182, 184 and 78. The other terminal of that secondary winding is connected to the cathode of the controlled rectifier 70 by junctions 176, 178, 110, 108, 106 and 66.

A diode 186 has the cathode thereof connected to the junction 180 and has the anode thereof connected to the junction 178. A diode 188 has the anode thereof connected to the junction 178 and has the cathode thereof connected to the junction 182.

The secondary winding 38 of the current transformer 34 is connected across a resistor 214 by junctions 212 and 216. The junction 216 is directly connected to the junction 180; and a double Zener diode 218 is connected between the junctions 212 and 184.

Whenever the terminals 20 and 22 are connected to a suitable A.C. supply, as by a switch or by relay contacts, and alternating voltage will appear at the terminal 20. Initially, both the controlled rectifier 54 and the controlled rectifier 70 will be non-conductive. When the voltage at the terminal 20 becomes positive, as during the half-cycles 220 and 224 of FIG. 2, current will flow from the terminal 20 via junction 24, primary winding 36, junctions 40 and 42, diode 44, junctions 48 and 58, resistor 74, diode 76, junction 78, the gate-to-cathode circuit of controlled rectifier 70, junction 66, indicator 72, junction 68, diode 90, junctions 88 and 92, terminal 94, load 95 terminal 112, conductor 111, and junction 26 to terminal 22. Also, current will flow from terminal 20 via junction 24, primary winding 30, and junction 26 to terminal 22.

The flow of current through the gate-to-cathode circuit of controlled rectifier 70 will provide a pulse 228, shown in FIG. 2, which will render that controlled rectifier conductive; but that controlled rectifier will not be able to supply power to the load 95 because the terminal 22 will be negative throughout the half-cycle 220. As a result, the rendering of the controlled rectifier 70 conductive will primarily charge the capacitor 60—current flowing from terminal 20 via junction 24, primary winding 36, junctions 40 and 42, diode 44, junctions 48 and 58, capacitor 60, junctions 62 and 64, controlled rectifier 70, junction 66, inductor 72, junction 68, diode 90, junctions 88 and 92, terminal 94, load 95, terminal 112, conductor 111, and junction 26 to terminal 22. Because of that current flow, the left-hand terminal of the capacitor 60 will become positive and the right-hand terminal of that capacitor will become negative. As that capacitor becomes charged, during the half-cycle 220, the current flowing through the anode-to-cathode circuit of the controlled rectifier 70 will decrease until that controlled rectifier again becomes non-conductive.

The flow of current through the primary winding 30 of transformer 28, during the half-cycle 220, will cause current to flow through the secondary winding 32 of that transformer; and a positive voltage will appear at the upper terminal of that secondary winding. As a result, current will flow from that upper terminal via junction 114, resistor 116, junction 118, and resistor 120 to junction 122; and then part of that current will flow through junctions 124, 126 and 128, resistor 130, junction 132, and resistor 134 to the junction 136, another part of that current will flow through resistor 174, junctions 172, 173, capacitor 196, junctions 148, 150 and 152, the diode 154 to the junction 136, still another part of that current will flow through junction 124, Zener diode 190, junctions 146, 148, 150 and 152, and diode 154 to the junction 136, and the rest of that current will flow through junctions 124 and 126, resistor 192, the emitter-collector circuit of transistor 194, junction 173, capacitor 196, junctions 148, 150 and 152, and diode 154 to the junction 136. Thereafter all four parts of that current will flow through resistor 138 to the lower terminal of the secondary winding 32.

The flow of current through the Zener diode 190 will make the left-hand terminal of that diode positive and will also fix the voltage between the junctions 124 and 146. The voltage across the resistor 120 will add to the voltage across the Zener diode 190, whereas the voltage across the resistor 130 will subtract from the voltage across the Zener diode 190. Since the resistor 120 and the Zener diode 190 are essentially connected in parallel with the base-two base-one circuit of the unijunction transistor 156 whereas the resistor 130 and the Zener diode 190 are essentially connected in parallel with the base-two base-one circuit of the unijunction transistor 164, a larger voltage will, throughout the half-cycle 220, exist across the base-two base-one circuit of the unijunction transistor 156 than will exist across the base-two base-one circuit of the transistor 164. The flow of the said other part and of the rest of the current through the capacitor 196 will charge that capacitor; and when the voltage across that capacitor reaches a value of about sixty percent of the voltage across the base-two base-one circuit of the unijunction transistor 164, that unijunction transistor will turn "on" and discharge the capacitor 196 through the primary winding 168 of the transformer 166.

The resulting flow of current through that primary winding will cause current to flow in the secondary winding 170 of that transformer; and this means that current will flow from the left-hand terminal of that secondary winding via junctions 182, 184 and 78, the gate-to-cathode circuit of controlled rectifier 70, and junctions 66, 106, 108, 110, 178 and 176 to the right-hand terminal of that secondary winding. The flow of current through the gate-to-cathode circuit of controlled rectifier 70 will provide a pulse 230, shown in FIG. 2, which will again render that controlled rectifier conductive; but that controlled rectifier will not be able to supply power to the load 95 because the terminal 22 will be negative throughout the half-cycle 220. Further, since the capacitor 60 is still charged with the left-hand terminal thereof positive, substantially no current will flow through the controlled rectifier 70; and hence that controlled rectifier will again become non-conductive.

All of this means that during the half-cycle 220 of the A.C. supply, the controlled rectifier 70 was rendered conductive for a short period of time by the pulse 228, and was again rendered conductive for a short period of time by the pulse 230, but did not supply power to the load 95. Instead, that controlled rectifier caused the capacitor 60 to become charged with the left-hand terminal thereof positive.

When the voltage at the terminal 20 becomes negative and the voltage at the terminal 22 becomes positive, at the beginning of half-cycle 222 of the A.C. supply, the capacitor 60 will start discharging. In doing so, that capacitor will cause current to flow from the left-hand terminal thereof via junction 58, resistor 74, diode 76, junction 78, the gate-to-cathode circuit of controlled rectifier 70, junction 66, inductor 72, junction 68, diode 90, junction 88, diode 86, and junctions 64 and 62 to the right-hand terminal of that capacitor. That current flow will supply a pulse 232, shown in FIG. 2, to the gate of the controlled rectifier 70, thereby rendering that controlled rectifier conductive. At this time, that controlled rectifier will start supplying power pulse 244 to the load 95—current flowing from the terminal 22 via junction 26, conductor 111, terminal 112, load 95, terminal 94, junctions 92 and 88, diode 86, junction 64, controlled rectifier 70, junction 66, inductor 72, junctions 68 and 52, diode 46, junctions 42 and 40, primary winding 36, and junction 24 to the terminal 20.

The conductivity of the controlled rectifier 70 will be so high that substantially no current will flow from junction 64 via junction 62, resistor 80, diode 82, junction 84, the gate-to-cathode circuit of the controlled rectifier 54, junction 50 and junction 106 to the junction 66. Consequently, the initiation of the half-cycle 222 will render the controlled rectifier 70 conductive but will not render the controlled rectifier 54 conductive. Because the latter controlled rectifier is not rendered conductive, the capacitor 60 will not have a low resistance path through which it could discharge; and hence that capacitor will remain charged with the left-hand terminal thereof positive.

When the voltage at the terminal 20 became negative and the voltage at the terminal 22 became positive, at the beginning of the half-cycle 222, current began to flow from terminal 22 via junction 26, primary winding 30 of transformer 28, and junction 24 to the terminal 20. That flow of current caused current to flow through the secondary winding 32 of the transformer 28; and a positive voltage appeared at the lower terminal of that secondary winding. As a result, current flowed from that lower terminal via resistor 138, junction 136, resistor 134, junction 132, and resistor 130 to junction 128; and then part of that current flowed through junctions 126, 124 and 122, resistor 120, junction 118, and resistor 116 to the junction 114, another part of that current flowed through junction 126, resistor 192, the emitter-collector circuit of transistor 194, junction 173, capacitor 196, junctions 148, 146 and 144, and diode 142 to the junction 114, still another part of that current flowed through junctions 126 and 124, Zener diode 190, junctions 146 and 144, and diode 142 to the junction 114, and the rest of that current flowed through junctions 126, 124 and 122, resistor 174, junctions 172 and 173, capacitor 196, junctions 148, 146 and 144, and diode 142 to the junction 114. Thereafter, all four parts of that current flowed to the upper terminal of the secondary winding 32.

The flow of current through the Zener diode 190 again made the left-hand terminal of that diode positive and again fixed the voltage between the junctons 124 and 146. The voltage across the resistor 130 added to the voltage across the Zener diode 190 while the voltage across the resistor 120 subtracted from the voltage across that Zener diode. Since the resistor 120 and the Zener diode 190 are essentially connected in parallel with the base-two base-one circuit of the unijunction transistor 156 whereas the resistor 130 and that Zener diode are essentially connected in parallel with the base-two base-one circuit of the unijunction transistor 164, a larger voltage existed, throughout the half-cycle 222, across the base-two base-one circuit of the unijunction transistor 164 than existed across the base-two base-one circuit of the transistor 156. The flow of the said other part and the rest of the current through the capacitor 196 charged that capacitor; and when the voltage across that capacitor reached a value of about sixty percent of the voltage across the base-two base-one circuit of the unijunction transistor 156, that unijunction transistor turned "on" and discharged the capacitor 196 through the primary winding 160 of the transformer 158. The resulting flow of current through that primary winding caused current to flow in the secondary winding 162 of that transformer; and hence current flowed from the left-hand terminal of that secondary winding via junctions 180 and 84, the gate-to-cathode circuit of controlled rectifier 54, and junctions 50, 106, 108, 110, 178 and 176 to the right-hand terminal of that secondary winding. That flow of current through the gate-to-cathode circuit of controlled rectifier 54 provided a pulse 234, shown in FIG. 2, which rendered that controlled rectifier conductive. As that controlled rectifier became conductive, the charge on the capacitor 60 caused current to flow from the left-hand terminal of that capacitor via junctions 58 and 48, controlled rectifier 54, junctions 50, 106 and 66, controlled rectifier 70, and junctions 64 and 62 to the right-hand terminal of that capacitor. The resulting inverse current flow through the controlled rectifier 70 promptly rendered that controlled rectifier non-conductive. When that controlled rectifier became non-conductive, the power pulse 244 which was being supplied to the load 95 by the A.C. supply was terminated.

Although the controlled rectifier 54 was rendered conductive by the pulse 234, that controlled rectifier was unable to supply power to the load 95 because the terminal 20 was negative throughout the half-cycle 222. However, the rendering of the controlled rectifier 54 conductive enabled current to flow from terminal 22 via junction 26, conductor 111, terminal 112, load 95, terminal 94, junctions 92 and 88, diode 86, junctions 64 and 62, capacitor 60, junctions 58 and 48, controlled rectifier 54, junctions 50, 106 and 66, inductor 72, junctions 68 and 52, diode 46, junctions 42 and 40, primary winding 36, and junction 24 to terminal 20. That flow of current discharged the capacitor 60 and then charged that capacitor so the right-hand terminal thereof was positive. As the capacitor 60 became charged, during the half-cycle 222, the current flowing through the controlled rectifier 54 decreased until that controlled rectifier again became non-conductive.

All of this means that during the half-cycle 222, the controlled rectifier 70 was rendered conductive by the charge on the capacitor 60 and supplied power pulse 244 to the load 95. After a predetermined length of time, the unijunction transistor 156 caused the transformer 158 to render the controlled rectifier 54 conductive; and very promptly, the charge on the capacitor 60 rendered the controlled rectifier 70 non-conductive. Subsequently, the A.C. supply discharged the capacitor 60 through the controlled rectifier 54 and then charged that capacitor with its right-hand terminal positive. As that capacitor became so charged, the controlled rectifier 54 again became non-conductive. During the half-cycle 222, the controlled rectifier 70 served as a power-supplying controlled rectifier and the controlled rectifier 54 served as a commutating controlled rectifier.

When the voltage at the terminal 20 again becomes positive and the voltage at the terminal 22 again becomes negative, at the beginning of the half-cycle 224 of the A.C. supply, the capacitor 60 will start discharging. In doing so, that capacitor will cause current to flow from the right-hand terminal thereof via junction 62, resistor 80, diode 82, junction 84, the gate-to-cathode circuit of controlled rectifier 54, junctions 50, 106 and 66, inductor 72, junctions 68 and 52, diode 46, junction 42, diode 44, and junctions 48 and 58 to the left-hand terminal of that capacitor. That current flow will supply a pulse 236, shown in FIG. 2, to the gate of the controlled rectifier 54, thereby rendering that controlled rectifier conductive. At this time, that controlled rectifier will start supplying power pulse 246 to the load 95—current flowing from the terminal 20 via junction 24, primary winding 36, junctions 40 and 42, diode 44, junction 48, controlled rectifier 54, junctions 50, 106 and 66, inductor 72, junction 68, diode 90, junctions 88 and 92, terminal 94, load 95, terminal 112, conductor 111, and junction 26 to the terminal 22.

The conductivity of the controlled rectifier 54 will be so high that substantially no current will flow from junction 48 via junction 58, resistor 74, diode 76, junction 78 and the gate-to-cathode circuit of controlled rectifier 70 to the junction 66. Consequently, the initiation of the half-cycle 224 will render the controlled rectifier 54 conductive but will not render the controlled rectifier 70 conductive. Because the latter controlled rectifier is not rendered conductive, the capacitor 60 will not have a low resistance path through which it could discharge; and hence that conductor will remain charged with the right-hand terminal thereof positive.

When the voltage at the terminal 20 again became positive and the voltage at the terminal 22 again became negative, at the beginning of the half-cycle 224, current began to flow from terminal 20 via junction 24, primary winding 30 of transformer 28, and junction 26 to the terminal 22. That flow of current caused current to flow through the secondary winding 32 of the transformer 28 in the same manner in which current flowed through that secondary winding during the half-cycle 220. Consequently, the voltage across the resistor 120 added to the voltage across the Zener diode 190 whereas the voltage across the resistor 130 subtracted from the voltage across that Zener diode. This means that a larger voltage existed, throughout the half-cycle 224, across the base-two base-one circuit of the unijunction transistor 156 than existed across the base-two base-one circuit of the transistor 164. Hence, when the voltage across the capacitor 196 reached a value of about sixty percent of the voltage across the base-two base-one circuit of the unijunction transistor 164, that unijunction transistor turned "on" and discharged the capacitor 196 through the primary winding 168 of the transformer 166. The resulting flow of current through that primary winding caused the secondary winding 170 of the transformer 166 to cause current to flow through the gate-to-cathode circuit of the controlled rectifier 70; and that current flow provided a pulse 238, shown in FIG. 2, which rendered that controlled rectifier conductive. As that controlled rectifier became conductive, the charge on the capacitor 60 caused current to flow from the right-hand terminal of that capacitor via junctions 62 and 64, controlled rectifier 70, junctions 66, 106 and 50, controlled rectifier 54, and junctions 48 and 58 to the left-hand terminal of that capacitor. The resulting inverse current flow through the controlled rectifier 54 promptly rendered that controlled rectifier non-conductive. When that controlled rectifier became non-conductive, the power pulse 246 which was being supplied to the load 95 by the A.C. supply was terminated.

Although the controlled rectifier 70 was rendered conductive by the pulse 238, that controlled rectifier was unable to supply power to the load 95 because the terminal 22 was negative throughout the half-cycle 224. However, the rendering of the controlled rectifier 70 conductive enabled current to flow from terminal 20, via junction 24, primary winding 36, junctions 40 and 42, diode 44, junctions 48 and 58, capacitor 60, junctions 62 and 64, controlled rectifier 70, junction 66, inductor 72, junction 68, diode 90, junctions 88 and 92, terminal 94, load 95, terminal 112, conductor 111, and junction 26 to the terminal 22. That flow of current discharged the capacitor 60 and then charged that capacitor so the left-hand terminal thereof was positive. As the capacitor 60 became charged, during the half-cycle 224, the current flowing through the controlled rectifier 70 decreased until that controlled rectifier again became non-conductive.

All of this means that during the half-cycle 224, the controlled rectifier 54 was rendered conductive by the charge on the capacitor 60 and supplied power pulse 246 to the load 95. After a predetermined length of time, the unijunction transistor 164 caused the transformer 166 to render the controlled rectifier 70 conductive; and, very promptly, the charge on the capacitor 60 rendered the controlled rectifier 54 non-conductive. Subsequently, the A.C. supply discharged the capacitor 60 through the controlled rectifier 70 and charged that capacitor with its left-hand terminal positive. As that capacitor became so charged, the controlled rectifier 70 again became non-conductive. During the half-cycle 224, the controlled rectifier 54 served as a power-supplying controlled rectifier and the controlled rectifier 70 served as a commutating controlled rectifier.

When the voltage at the terminal 20 again becomes negative and the voltage at the terminal 22 again becomes positive, at the beginning of the half-cycle 226 of the A.C. supply, the capacitor 60 will start discharging. In doing so, that capacitor will cause current to flow through the gate-to-cathode circuit of the controlled rectifier 70; and that current flow will supply a pulse 240, shown in FIG. 2, to the gate of that controlled rectifier and thereby render that controlled rectifier conductive. At this time, that controlled rectifier will start supplying power pulse 248 to the load 95 in the same manner in which that controlled rectifier supplied power pulse 244 to that load during the half-cycle 222. The conductivity of the controlled rectifier 70 will be so high that insufficient current will be able to flow through the gate-to-cathode circuit of the controlled rectifier 54 to render that controlled rectifier conductive. Because the controlled rectifier 54 will remain non-conductive, the capacitor 60 will retain its charge and will have the left-hand terminal thereof positive.

Subsequently during the half-cycle 226, the voltage across the capacitor 196 will reach a value approximating sixty percent of the voltage across the base-two base-one circuit of the unijunction transistor 156, and then that unijunction transistor will turn "on" and discharge that capacitor through the primary winding 160 of the transformer 158. That transformer will then cause a pulse 242, shown in FIG. 2, to be applied to the gate of the controlled rectifier 54; and that pulse will render that controlled rectifier conductive. As that controlled rectifier becomes conductive, the charge on the capacitor 60 will force an inverse current to flow through the controlled rectifier 70, thereby rendering that controlled rectifier non-conductive; and, as that contolled rectifier becomes non-conductive, the power pulse 248 will be terminated.

Although the controlled rectifier 54 was rendered conductive by the pulse 242, that controlled rectifier was unable to supply power to the load 95 because the terminal 20 was negative throughout the half-cycle 226. However, the rendering of the controlled rectifier 54 conductive enabled the A.C. supply to discharge the capacitor 60 and then charge that capacitor so the right-hand terminal thereof was positive. As that capacitor became charged, during half-cycle 226, the current flowing through the controlled rectifier 54 decreased until that controlled rectifier again became non-conductive.

All of this means that during the half-cycle 226, the controlled rectifier 70 was rendered conductive by the charge on the capacitor 60 and supplied power pulse 248 to the load 95. After a predetermined length of time, the unijunction transistor 156 caused the transformer 158 to render the controlled rectifier 54 conductive; and, very promptly, the charge on the capacitor 60 rendered the controlled rectifier 70 non-conductive. Subsequently, the A.C. supply dischargd the capacitor 60 through the controlled rectifier 54 and charged that capacitor with its right-hand terminal positive. As that capacitor became so charged, the controlled rectifier 54 again became non-conductive. During the half-cycle 226, the controlled rectifier 70 served as a power-supplying controlled rectifier and the controlled rectifier 54 served as a commutating controlled rectifier.

Subsequent half-cycles of the A.C. supply will be exact duplicates of the half-cycles 224 and 226. In each of those half-cycles, the charge on the capacitor 60 will render the power-supplying controlled rectifier conductive and that controlled rectifier will supply power to the load 95 until the appropriate unijunction transistor turns "on" and renders the commutating controlled rectifier conductive with consequent rendering of the power-supplying controlled rectifier non-conductive.

The control system of FIG. 1 makes it possible to vary the durations of the power pulses which are supplied to the load 95 during the various half-cycles of the A.C. supply. By connecting the terminals 205 and 206 of FIG. 1 to a source of adjustable D.C. voltage, the conductivity of the transistor 194 can be varied; and that transistor acts as a resistor which is connected in parallel with the resistor 174. Further, that transistor and that resistor constitute the resistance of the RC network which includes the capacitor 196; and hence the variations in the resistance of that transistor will vary the time constant of the RC network—with consequent variations in the time periods needed to turn "on" the unijunction transistors 156 and 164.

The terminal 206 will be connected to the positive terminal of the source of adjustable D.C. voltage, and the terminal 205 will be connected to the negative terminal of that source. As a result, an increase in the value of the D.C. voltage applied to the terminals 205 and 206 will render the transistor 194, which is a PNP transistor, less conductive. By increasing the value of the voltage applied to the terminals 205 and 206, the effective resistance of the parallel-connected transistor 194 and resistor 174 will be increased with a corresponding increase in the time constnat of the RC network including the capacitor 196. That increased time constant will lengthen the time periods needed to turn "on" the unijunction transistors 156 and 164, and will thus increase the time periods between the turning "on" of the power-supplying controlled rectifiers and the turning "on" of the commutating controlled rectifiers—with a consequent increase in the durations of the power pulses supplied to the load 95 during the half-cycles of the A.C. supply. Conversely, a decrease in the value of the D.C. voltage applied to the terminals 205 and 206 will render the transistor 194 more conductive. By decreasing the value of the voltage applied to the terminals 205 and 206, the effective resistance of the parallel-connected transistor 194 and resistor 174 will be decreased with a corresponding decrease in the time constant of the RC network including the capacitor 196. That decreased time constant will shorten the time periods needed to turn "on" the unijunction transistors 156 and 164, and will thus decrease the time periods between the turning "on" of the power-supplying controlled rectifiers and the turning "on" of the commutating controlled rectifiers—with a consequent decrease in the durations of the power pulses supplied to the load 95 during the half-cycles of the A.C. supply. The durations shown in FIG. 3 for the power pulses 244, 246 and 248 are approximately one-half of the durations of the half-cycles 222, 224 and 226; but, by appropriate adjustment of the D.C. voltage applied to the terminals 205 and 206, the durations of those power pulses can be made very short or can be made substantially as long as the durations of those half-cycles.

During normal conditions of operation of the control system of FIG. 1, the pulses from the unijunction transistors 156 and 164 will enable the commutating controlled rectifiers to turn "on" and permit the capacitor 60 to render the power-supplying controlled rectifiers non-conductive, with consequent termination of the power pulses supplied to the load 95. However, if the current flowing through the primary winding 36 of the current transformer 34 rises to a predetermined level, the secondary winding 38 of that transformer will cause enough current to flow through the resistor 214 to increase the voltage across that resistor to the point where the commutating controlled rectifiers will be turned "on."

Specifically, during all half-cycles of the A.C. supply wherein the terminal 20 is positive and the terminal 22 is negative, the voltage at the right-hand end of the secondary winding 38 of current transformer 34 will be positive; and current will flow from that right-hand end through junction 212, resistor 214, and junction 216 to the left-hand end of that secondary winding. As long as the value of the current flowing through the primary winding 36 is below said predetermined level, the voltage developed across the resistor 214 will be too small to cause current to flow through the double Zener diode 218 and the gate-to-cathode circuit of the controlled rectifier 70. However, when the value of the current flowing through the primary winding 36 of current transformer 34 rises to the said predetermined level, the voltage across the resistor 214 will quickly increase to the point where current will flow from the right-hand end of secondary winding 38 via junction 212, double Zener diode 218, junctions 184 and 78, the gate-to-cathode circuit of controlled rectifier 70, junctions 66, 106, 108, 110 and 178, diode 186, and junctions 180 and 216 to the left-hand end of that secondary winding. That flow of current through the gate-to-cathode circuit of the controlled rectifier 70 will render that controlled rectifier conductive; and, thereupon, the capacitor 60 will act through that controlled rectifier to cause inverse current to flow through the controlled rectifier 54 to render the latter controlled rectifier non-conductive.

During all half-cycles of the A.C. supply wherein the terminal 20 is negative and the terminal 22 is positive, the voltage at the left-hand end of the secondary winding 38 of current transformer 34 will be positive, and current will flow from that left-hand end through junction 216, resistor 214 and junction 212 to the right-hand end of that secondary winding. As long as the value of the current flowing through the primary winding 36 is below said predetermined level, the voltage developed across the resistor 214 will be too small to cause current to flow through the double Zener diode 218 and the gate-to-cathode circuit of the controlled rectifier 54. However, when the value of the current flowing through the primary winding 36 of current transformer 34 rises to the said predetermined level, the voltage across the resistor 214 will quickly increase to the point where current will flow from the left-hand end of secondary winding 38 via junctions 216, 180 and 84, the gate-to-cathode circuit of controlled rectifier 54, junctions 50, 106, 108, 110 and 178, diode 188, junctions 182 and 184, double Zener diode 218, and the junction 212 to the right-hand end of that secondary winding. That flow of current through the gate-to-cathode circuit of the controlled rectifier 54 will render that controlled rectifier conductive; and, thereupon, the capacitor 60 will act through that controlled rectifier to cause inverse current to flow through the controlled rectifier 70 to render the latter controlled rectifier non-conductive.

The current transformer 34 can thus coact with resistor 214, double Zener diode 218, and diodes 186 and 188 to render the commutating controlled rectifiers conductive to enable the capacitor 60 to render the power-supplying controlled rectifiers non-conductive. This means that current transformer 34, resistor 214, double Zener diode 218, and diodes 186 and 188 can terminate the power pulses being supplied to the load 95 by the power-supplying controlled rectifiers whenever the value of the current flowing through those controlled rectifiers reaches said predetermined level. In this way, the control system of FIG. 1 can protect the controlled rectifiers 54 and 70, and can also protect the load 95, against damage caused by unduly high current levels.

When current transformer 34, resistor 214, double Zener diode 218, and diodes 186 and 188 supply the "firing" signals which render the commutating controlled rectifiers conductive, those controlled rectifiers will subsequently receive additional "firing" signals from the unijunction transistors 156 and 164. If those additional "firing" signals are received while those commutating controlled rectifiers are discharging and then oppositely charging the capacitor 60, those "firing" signals will not affect those controlled rectifiers. However, if those additional "firing" signals are received after the capacitor 60 has been oppositely charged and the commutating controlled rectifiers have again become non-conductive, those "firing" signals will render those commutating controlled rectifiers conductive; but, because the capacitor 60 is charged, those commutating controlled rectifiers will promptly become non-conductive again.

The current transformer 34, the double Zener diode 218, the resistor 214, and the diodes 186 and 188 constitute a convenient arrangement for "firing" the commutating controlled rectifiers to shorten the power pulses, being supplied to the load by the power-supplying controlled rectifiers, whenever a predetermined change in condition occurs. However, many other arrangements could be substituted for the arrangement shown. Specifically, any arrangement which can respond to an overload current, to an excessive voltage, to a voltage differential, to a current differential, to an average voltage, to an average current, to a peak voltage, to a peak current, to the root mean square of a voltage, to the root mean square of a current, or to any other condition to cause a "firing" pulse to be applied to a commutating controlled rectifier could be substituted for the arrangement shown.

In the operation of the control system of FIG. 1, resistor 210 will enable emitter-base current to flow through transistor 194 and rapidly turn that transistor "on" when no voltage is applied to terminals 205 and 206. This means that with no voltage across terminals 205 and 206, the effective resistance of parallel-connected resistor 174 and transistor 194 will be minimal; and hence the time constant of the RC network including capacitor 196 will be minimal. Consequently, when no voltage across terminals 205 and 206, the durations of the power pulses supplied to load 95 will be minimal.

Resistors 200 and 204 and capacitor 208 provide a filtering action. That action is desirable because it makes the time constant of the RC network including capacitor 196 predictable and controllable.

When either the controlled rectifier 54 or the controlled rectifier 70 is rendered non-conductive by the flow of inverse current through it, an inverse voltage must be maintained on that controlled rectifier for about fifteen microseconds to keep that controlled rectifier from promptly becoming conductive again. Inductor 72 will limit the rate of which the capacitor 60 is discharged, and will thus enable that capacitor to maintain the desired inverse voltage on that controlled rectifier for about fifteen microseconds. As the capacitor 60 starts to charge in the opposite direction, the rate of charge of that capacitor must be limited to less than twenty volts per micro-second to keep the controlled rectifier, that was just rendered non-conductive, from being rendered conductive once again. Inductor 72 will limit the rate at which the A.C. supply can charge capacitor 60 in the opposite direction to less than twenty volts per micro-second, and will thus keep that controlled rectifier from being rendered conductive once again.

At the time the voltage across capacitor 60 reaches the value of the voltage of the A.C. supply, inductor 72 will still have current flowing through it. If that current were to be allowed to flow through capacitor 60, the voltage across that capacitor could rise substantially above the voltage of the A.C. supply. Any such substantial voltage rise is prevented by diode 56 which will pass current whenever the voltage across inductor 72 exceeds the forward drop of that diode. Any such substantial voltage rise could also be prevented by serially-connected diodes 46 and 44 and controlled rectifier 54, when that controlled rectifier is conductive, or by the serially-connected diodes 90 and 86 and controlled rectifier 70, when that controlled rectifier is conductive; because those serially-connected diodes and controlled rectifiers constitute possible discharge paths for the inductive energy in inductor 72. However, the flow of current through those serially-connected diodes and controlled rectifiers would increase the heating of those controlled rectifiers, and any such increased heating is obviated by the presence of diode 56; because substantially all of the inductive energy in inductor 72 will be dissipated by the flow of current through that diode.

Some A.C. supplies have appreciable inductance; and such supplies could supply larger-than-desired amounts of energy to capacitor 60. The application of such large amounts of energy to capacitor 60 could unduly increase the voltage across that capacitor. To keep A.C. supplies, which have appreciable inductance, from applying larger-than-desired amounts of energy to capacitor 60, capacitor 104 is connected so it is essentially in parallel with capacitor 60. Specifically, when terminal 20 is positive and controlled rectifier 70 is conductive, current will flow from that terminal via junction 24 and primary winding 36 to junction 40; and then part of that current can flow through junction 42, diode 44, junctions 48 and 58, capacitor 60, junctions 62 and 64, and controlled rectifier 70 to junction 66, while the rest of that current will flow through diode 96, junctions 98 and 100, parallel-connected resistor 109 and capacitor 104, junctions 110 and 108, and junction 106 to junction 66. The combined parts of that current will then flow through inductor 72, junction 68, diode 90, junctions 88 and 92, terminal 94, load 95, terminal 112, conductor 111, and junction 26 to terminal 22. Similarly, when terminal 22 is positive and controlled rectifier 54 is conductive, current will flow from that terminal via junction 26, conductor 111, terminal 112, load 95, and terminal 94 to junction 92; and then part of that current can flow through junction 88, diode 86, junctions 64 and 62, capacitor 60, junctions 58 and 48, controlled rectifier 54, and junctions 50 and 106 to junction 66, while the rest of that current will flow through diode 102, junctions 100 and 98, parallel-connected capacitor 104 and resistor 109, junctions 110 and 108, and junction 106 to junction 66. The combined parts of that current will then flow through inductor 72, junctions 68 and 52, diode 46, junctions 42 and 40, primary winding 36, and junction 24 to terminal 20. Capacitor 104 will have a capacity which is much larger than that of capacitor 60; and hence most of the energy from the A.C. supply will be stored in capacitor 104 rather than in capacitor 60. In this way, the voltage across capacitor 60 will be kept from rising unduly even if the A.C. supply has appreciable inductance. Resistor 109 will serve to "bleed off" the energy stored within capacitor 104; but that resistor will have a sufficiently large resistance value to render the flow of current through load 95 negligible when both of the controlled rectifiers 54 and 70 are non-conductive. Where desired, the parallel-connected capacitor 104 and resistor 109 could be replaced by a Zener diode which had a Zener voltage that just exceeded the peak voltage of the A.C. supply. Such a Zener diode would remain non-conductive until the voltge across the capacitor rose to the peak voltage of the A.C. supply, but would then become conductive and dissipate the remaining inductive energy from that supply, thereby keeping that energy from further increasing the voltage across capacitor 60. Such a Zener diode would cost more than capacitor 104 and resistor 109, but it would increase the overall efficiency of the control system of FIG. 1 by reducing the total amount of energy dissipated by that control system.

In the foregoing description of the operation of the control system of FIG. 1, it was assumed that the voltage at the terminal 20 was positive during the first half-cycle of the A.C. supply. If that voltage had been negative, current would have flown from terminal 22 via junction 26, conductor 111, junction 112, load 95, junctions 94, 92 and 88, diode 86, junctions 64 and 62, resistor 80, diode 82, junction 84, the gate-to-cathode circuit of controlled rectifier 54, junctions 50, 106 and 66, inductor 72, junctions 68 and 52, diode 46, junctions 42 and 40, primary winding 36, and junction 24 to terminal 20. Also, current would have flown from terminal 22 via junction 26, primary winding 30, and junction 24 to terminal 20.

The flow of current through that gate-to-cathode circuit would have rendered that controlled rectifier conductive, but that controlled rectifier could not have suppleid power to the load 95 because the terminal 20 would have been negative throughout that first half-cycle. However, the rendering of the controlled rectifier conductive would have caused the capacitor 60 to become charged with its right-hand end positive. As that capacitor became charged, the current flowing through that controlled rectifier would have decreased to the point where that controlled rectifier would have again become non-conductive.

The flow of current through the primary winding 30 would have enabled the secondary winding 32, the voltage divider which includes resistors 116, 120, 130, 134 and 138, and the Zener diode 190 to cause the capacitor 196 to turn the unijunction transistor 156 "on"; and thereupon transformer 158 would have applied a pulse, similar to pulse 234 in FIG. 2, to the gate-to-cathode circuit of controlled rectifier 54. While that pulse would have rendered that controlled rectifier conductive, once again, that controlled rectifier would not have supplied power to the load 95, because terminal 20 would still have been negative. At the beginning of the second half-cycle of the A.C. supply, capacitor 60 would have caused current to flow through the gate-to-cathode circuit of controlled rectifier 54 and thereby rendered that controlled rectifier conductive. That controlled rectifier would have started supplying a power pulse, similar to power pulse 246 in FIG. 3, to the load 95; and later in that half-cycle the unijunction transistor 164 would have supplied a pulse, like the pulse 238 in FIG. 2, to the gate-to-cathode circuit of controlled rectifier 70. That second half-cycle, and all even-numbered half-cycles, would be similar to the half-cycle 224 in FIG. 2; and the third half-cycle, and all subsequent odd-numbered half-cycles, would be similar to the half-cycle 226 in FIG. 2.

It will be noted that the power pulses are initiated close to the starting points of the various half-cycles of the A.C. supply; and hence those power pulses are initiated while the instantaneous voltages, applied across the controlled rectifiers 54 and 70 by that A.C. supply, are small. Further, it will be noted that when the controlled rectifiers charge the capacitor 60, those controlled rectifiers become non-conductive as the valve of the current flowing through them falls below the level needed to keep those controlled rectifiers conductive; and that current value will reach that level when the voltage across the capacitor 60 increases to the peak voltage of the A.C. supply. The overall result is that the controlled rectifiers of the control system of FIG. 1 can not be subjected to voltages in excess of the peak voltage of the A.C. supply; and this means that controlled rectifiers with lower-than-usual working voltages can be used or that the margin of safety will be higher where controlled rectifiers with normal and usual working voltages are used.

Referring to FIG. 4, the numerals 250 and 252 denote terminals which can be connected to a suitable A.C. supply by a switch or by relay contacts not shown. Junctions 254 and 256, a diode 258, and a junction 260 connect the terminal 250 to the anode of a controlled rectifier 262. A junction 64, an inductor 268, junctions 272 and 274, a diode 277, a junction 276, a terminal 278, a load 280, a terminal 282, and junctions 284 and 286 connect the cathode of that controlled rectifier to the terminal 252. The junctions 286 and 284, terminal 282, load 280, terminal 278, junction 276, a diode 275, and a junction 287 connect the terminal 252 to the anode of a controlled rectifier 288. Junctions 266 and 264, inductor 268, junction 272, a diode 292, and junctions 256 and 254 connect the cathode of the controlled rectifier 288 to the terminal 250. The junctions 266 and 274 connect a diode 270 in parallel with the inductor 268. A capacitor 290 connects the anodes of the controlled rectifiers 262 and 288 to each other.

The numeral 294 generally denotes an A.C. output, D.C. control, single phase magnetic amplifier. One section of the output winding of that magnetic amplifier is denoted by the numeral 296, and the other section of that output winding is denoted by the numeral 298; and the junctions 284 and 286 connect the lower ends of those sections together. A diode 300 has the anode thereof connected to the upper end of the section 296, and a diode 302 has the cathode thereof connected to the upper end of the section 298. The cathode of the diode 300 is connected to the anode of the diode 302 by a junction 304. An inductor 306 connects the junction 304 with the lower end of the primary winding 308 of a transformer 310; and the upper end of that primary winding is connected to the junction 254. Transformer 310 has a tapped secondary winding with an upper section 312 and a lower section 314; and that secondary winding is wound so the lower ends of the sections 312 and 314 thereof will be positive whenever the upper end of the primary winding 308 is positive. The upper end of section 312 is connected to the gate of the controlled rectifier 262 by a diode 316, and that diode has the cathode thereof connected to that gate. The lower end of section 314 is connected to the gate of the controlled rectifier 288 by a diode 318, and that diode has the cathode thereof connected to that gate. The center tap of the secondary winding of transformer 310 is connected to the junction 264.

The numeral 320 denotes the control winding of the magnetic amplifier 294; and the lower terminal of the right-hand section of that control winding is connected to a terminal 325. The lower terminal of the left-hand section of the control winding 320 is connected to a terminal 324 by a resistor 322. The upper terminals of the sections of the control winding 320 are connected together.

The terminals 250 and 252 can be selectively connected to a suitable A.C. supply by a switch or by relay contacts ont shown; and the terminals 324 and 325 can be connected to a source of adjustable D.C. voltage. The controlled rectifiers 262 and 288 of FIG. 4 will preferably be similar to the controlled rectifiers 54 and 70 of FIG. 1. The diodes 258, 275, 277, and 292 will preferably be similar to the diodes 44, 86, 90 and 46 of FIG. 1. Similarly, the capacitor 290, the inductor 268 and the diode 270 will preferably be similar to the capacitor 60, the inductor 72, and the diode 56 of FIG. 1.

Whenever the terminals 250 and 252 of FIG. 4 are connected to a suitable A.C. supply, an alternating voltage will appear at the terminal 250. Initially, the controlled rectifier 262 and the controlled rectifier 288 will be non-conductive. When the voltage at the terminal 250 becomes negative, as during the half-cycle 328 shown in FIG. 5, current will flow from terminal 252 via junction 286, section 296 of the output winding of the magnetic amplifier 294, diode 300, junction 304, inductor 306, primary winding 308, and junction 254 to the terminal 250. Current will not, initially, be able to flow through the load 280 because both of the controlled rectifiers 262 and 288 are initially non-conductive.

The "firing" angle of the magnetic amplifier 294 will be controlled by the value of the D.C. voltage applied to the terminals 324 and 325; and the source of adjustable D.C. voltage, which is connected to those terminals, can be adjusted to provide the desired "firing" angle for the magnetic amplifier 294. Until that magnetic amplifier "fires," only a limited amount of current will flow through the primary winding 308 of transformer 310; but, when that magnetic amplifier "fires," a substantial current pulse will be supplied to that primary winding. The resulting flow of current through the upper section 312 of the secondary winding of transformer 310 will make the upper end of that section positive; and current will then flow from that upper end via diode 316, the gate-to-cathode circuit of controlled rectifier 262, and junction 264 to the lower end of that section. That flow of current through the gate-to-electrode circuit of controlled rectifier 262 will provide a "firing" pulse 336, shown in FIG. 5, which will render that controlled rectifier conductive; but that controlled rectifier will not be able to supply power to the load 280 because the terminal 250 is negative throughout the half-cycle 328. However, controlled rectifier 262 will enable the capacitor 290 to become charged—current flowing from terminal 252 via junctions 286 and 284, terminal 282, load 280, terminal 278, junction 276, diode 275, junction 287, capacitor 290, junction 260, controlled rectifier 262, junction 264, inductor 268, junction 272, diode 292, and junctions 256 and 254 to the terminal 250. The capacitor 290 will become charged with its right-hand terminal positive; and as that capacitor becomes charged, during half-cycle 328, the current flowing through controlled rectifier 262 will decrease.

The magnetic amplifier 294 will, characteristically, remain conductive throughout the rest of half-cycle 328 and will thus enable the upper section 312 of the secondary winding of transformer 310 to maintain the pulse 336 throughout the rest of that half-cycle. Moreover, the inductor 306 will have a sufficiently large inductance to keep that magnetic amplifier conductive for a short time after the end of half-cycle 328; and hence the pulse 336 will be maintained until after the initiation of the half-cycle 330 shown in FIG. 5. This means that the controlled rectifier 262 will be kept conductive until after the initiation of half-cycle 330; and, as the terminal 250 becomes positive during that half-cycle, current will flow from that terminal via junctions 254 and 256, diode 258, junction 260, controlled rectifier 262, junction 264, inductor 268, junctions 272 and 274, diode 277, junction 276, terminal 278, load 280, terminal 282, and junctions 284 and 286 to the terminal 252. That current flow will enable the controlled rectifier 262 to start supplying the power pulse 346, shown in FIG. 5, to the load 280.

At the time the half-cycle 330 was initiated, some current began to flow from terminal 250 via junction 254, primary winding 308 of transformer 310, inductor 306, junction 304, diode 302, section 298 of the output winding of magnetic amplifier 294, and junctions 284 and 286 to the terminal 252. That flow of current is limited until that magnetic amplifier 294 again "fires"; but when that magnetic amplifier again "fires," a substantial current pulse will be applied to the primary winding 308. The resulting flow of current through the lower section 314 of the secondary winding of transformer 310 will make the lower end of that section positive. Consequently, current will then flow from that lower end via diode 318, the gate-to-cathode circuit of controlled rectifier 288, and junctions 266 and 264 to the upper end of that lower section. That flow of current through that gate-to-cathode circuit will provide a "firing" pulse 338, shown in FIG. 5, which will render the controlled rectifier 288 conductive; and that controlled rectifier will enable the capacitor 290 to cause an inverse current to flow through the controlled rectifier 262—current flowing from the right-hand terminal of that capacitor via junction 287, controlled rectifier 288, junctions 266 and 264, controlled rectifier 262, and junction 260 to the left-hand end of that capacitor. That flow of inverse current will render that controlled rectifier nonconductive, and will thus terminate the power pulse 346 shown in FIG. 5.

The controlled rectifier 288 will not, at this time, be able to supply power to the load 280 because the terminal 252 will be negative throughout the half-cycle 330. However, that controlled rectifier will permit the A.C. supply to discharge the capacitor 290 and then charge that capacitor in the opposite direction—current flowing from terminal 250 via junctions 254 and 256, diode 258, junction 260, capacitor 290, junction 287, controlled rectifier 288, junctions 266 and 264, inductor 268, junctions 272 and 274, diode 277, junction 276, terminal 278, load 280, terminal 282, and junctions 284 and 286 to the terminal 252. That flow of current will discharge the capacitor 290 and then charge that capacitor with the left-hand terminal thereof positive; and as that capacitor becomes charged, during half-cycle 330, the current flowing through controlled rectifier 288 will decrease.

Because of the inductor 306, the magnetic amplifier 294 will maintain the "firing" pulse 338 until after the initiation of the negative-going half-cycle 332 of the A.C. supply. This means that when the terminal 252 becomes positive, at the beginning of half-cycle 332, the controlled rectifier 288 will supply power to the load 280—current flowing from the terminal 252 via junctions 286 and 284, terminal 282, load 280, terminal 278, junction 276, diode 275, junction 287, controlled rectifier 288, junctions 266 and 264, inductor 268, junction 272, diode 292, and junctions 256 and 254 to the terminal 250. As a result, the controlled rectifier 288 will start supplying the power pulse 348, shown in FIG. 5, to the load 280.

Under normal conditions of operation, the power pulse 348 would have the same duration as the power pulse 346; but, for purposes of illustration, it will be assumed that an abnormal condition of operation has arisen and that a condition-responsive control pulse 342, shown in FIG. 5, will be supplied to the control system of FIG. 4. That condition-responsive control pulse could be supplied by a current transformer, a resistor, a double Zener diode, and two diodes which were similar to the current transformer 34, the resistor 214, the double Zener diode 218, and the diodes 186 and 188 of FIG. 1. However, that condition-responsive control pulse also could be supplied by any one of a number of arrangements which could couple that pulse into the gate-to-cathode circuit of the controlled rectifier 262. As soon as the pulse 342 is supplied to the gate-to-cathode circuit of the controlled rectifier 262, that controlled rectifier will become conductive; and the capacitor 290 will then cause inverse current to flow through the controlled rectifier 288—current flowing from the left-hand terminal of that capacitor via junction 260, controlled rectifier 262, junctions 264 and 266, controlled rectifier 288, and junction 287 to the right-hand terminal of that capacitor. That inverse current flow will promptly render controlled rectifier 288 non-conductive; and hence a shortened power pulse 348 will be supplied to the load 280.

Although the controlled rectifier 262 is conductive, that controlled rectifier will not, at this time, be able to supply power to the load 280 because the terminal 250 will be negative throughout the half-cycle 332. However, the controlled rectifier 262 will permit the A.C. supply to discharge the capacitor 290 and then charge that capacitor in the opposite direction — current flowing from terminal 252 via junctions 286 and 284, terminal 282, load 280, terminal 278, junction 276, diode 275, junction 287, capacitor 290, junction 260, controlled rectifier 262, junction 264, inductor 268, junction 272, diode 292, and junctions 256 and 54 to the terminal 50. The capacitor 290 will become charged with its right-hand terminal positive; and as that capacitor becomes charged, during half-cycle 332, the current flowing through the controlled rectifier 262 will decrease until that controlled rectifier becomes non-conductive.

Subsequently, during the half-cycle 332, the magnetic amplifier 294 will "fire" and will apply a substantial current pulse to the primary winding 308. The resulting flow of current through the upper section 312 of the secondary winding of transformer 310 will make the upper end of that section positive; and current will then flow from that upper end via diode 316, the gate-to-cathode circuit of controlled rectifier 262, and junction 264 to the lower end of that section. That flow of current through that gate-to-cathode circuit will provide a "firing" pulse 340, shown in FIG. 5, which will render the controlled rectifier 262 conductive. However, that controlled rectifier will not be able to supply power to the load 280 because the terminal 250 is negative throughout half-cycle 332; and that controlled rectifier will not be able to supply power to the capacitor 290 because that capacitor will still be charged. As a result, the "firing" pulse 340 will render the controlled rectifier 262 conductive but will not affect the condition of the load 280 or of the capacitor 290.

The inductor 306 and the magnetic amplifier 294 will maintain the pulse 340 throughout the rest of half-cycle 332 and until after the initiation of the half-cycle 334 shown in FIG. 5. This means that when the terminal 250 becomes positive, at the beginning of half-cycle 334, current will flow from terminal 250 via junctions 254 and 256, diode 258, junction 260, controlled rectifier 262, junction 264, inductor 268, junctions 272 and 274, diode 277, junction 276, terminal 278, load 280, terminal 282, and junctions 284 and 286 to the terminal 252. That current flow will enable controlled rectifier 262 to start supplying power pulse 350, shown in FIG. 5, to the load 280.

If the condition, which caused the condition-responsive control pulse 342 to be applied to the gate-to-cathode circuit of controlled rectifier 262, still exists, a condition-responsive control pulse 344, shown in FIG. 5, will be applied to the gate-to-cathode circuit of controlled rectifier 288. As soon as the pulse 344 is supplied to the gate-to-cathode circuit of controlled rectifier 288, that controlled rectifier will become conductive; and the capacitor 290 will then cause an inverse current to flow through the controlled rectifier 262—current flowing from the right-hand terminal of that capacitor via junction 287, controlled rectifier 288, junctions 266 and 264, controlled rectifier 262, and junction 260 to the left-hand terminal of that capacitor. That inverse current flow will promptly render the controlled rectifier 262 non-conductive; and hence a shortened power pulse 350 will be supplied to the load 280.

Although the controlled rectifier 288 is conductive, that controlled rectifier will not, at this time, be able to supply power to the load 280 because the terminal 252 will be negative throughout the half-cycle 334. However, the controlled rectifier 288 will permit the A.C. supply to discharge the capacitor 290 and then charge that capacitor in the opposite direction — current flowing from terminal 250 via junctions 254 and 256, diode 258, junction 260, capacitor 290, junction 287, controlled rectifier 288, junctions 266 and 264, inductor 268, junctions 272 and 274, diode 277, junction 276, terminal 278, load 280, terminal 282, and junctions 284 and 286 to the terminal 252. The capacitor 90 will become charged with its left-hand terminal positive; and as that capacitor becomes charged, during half-cycle 334, the current flowing through the controlled rectifier 288 will decrease until that controlled rectifier becomes non-conductive.

Subsequently during the half-cycle 334, the magnetic amplifier 294 will "fire" and will apply a substantial current pulse to the primary winding 308. The resulting flow of current through the lower section 314 of the secondary winding of transformer 310 will make the lower end of that section positive; and current will then flow from that lower end via diode 318, the gate-to-cathode circuit of controlled rectifier 288, and junctions 266 and 264 to the upper end of that section. That flow of current through that gate-to-cathode circuit will provide a "firing" pulse pulse 351, shown in FIG. 5, which will render the controlled rectifier 288 conductive. However, that controlled rectifier will not be able to supply power to the load 280 because the terminal 252 is negative throughout half-cycle 334; and that controlled rectifier will not be able to supply power to the capacitor 290 because that capacitor will still be charged. As a result, the "firing" pulse 351 will render the controlled rectifier 288 conductive but will not affect the condition of the load 280 or of the capacitor 290.

As long as the condition, which caused the condition-responsive control pulse 342 to be applied to the gate-to-cathode circuit of controlled rectifier 262 and which caused the condition-responsive control pulse 344 to be applied to the gate-to-cathode circuit of the controlled rectifier 288, exists, further half-cycles of the A.C. supply will provide power pulses that are similar to the power pulses 348 and 350. However, if that condition disappears, further half-cycles of the A.C. supply will provide power pulses that are similar to the power pulse 346 and to a negative-going counterpart of the power pulse.

It will thus be apparent that the control system of FIG. 4, like the control system of FIG. 1, can supply power pulses of different duration to a load. Further, that control system, like the control system of FIG. 1, initiates those power pulses close to the beginnings of the half-cycles of the A.C. supply and then subsequently terminates those power pulses before the ends of those half-cycles. One principal difference between the control system of FIG. 4 and the control system of FIG. 1 is that the "firing" signals for the commutating controlled rectifiers of FIG. 4 are maintained throughout the rest of the half-cycles and after the initiations of the ensuing half-cycles; and hence those "firing" signals also serve as the "firing" signals for those controlled rectifiers when those controlled rectifiers serve as the power controlled rectifiers for the control system of FIG. 4.

When, during the operation of the control system of FIG. 4, the upper end of the upper section 312 of the secondary winding of transformer 310 is made positive, the upper end of the lower section 314 of that secondary winding also will be made positive. However, that lower section will not, at that time, be able to cause current to flow because the diode 318 will block any such flow. Similarly, when the lower end of the lower section 314 of the secondary winding of transformer 310 is made positive, the lower end of the upper section 312 also will be made positive. However, that upper section will not, at that time, be able to cause current to flow because the diode 316 will block any such flow. Consequently, only the appropriate controlled rectifier will be rendered conductive when a substantial current pulse is applied to the primary winding 308 of transformer 310.

FIG. 6 discloses the essential portion of the control systems of FIGS. 1 and 4; and, as a result, the controlled rectifiers 366 and 372 of FIG. 6 are the same as the controlled rectifiers 54 and 70 of FIG. 1 and are the same as the controlled rectifiers 262 and 288 of FIG. 4. Also, the diodes 360, 384, 386 and 362 of FIG. 6 are the same as the diodes 44, 86, 90 and 46 of FIG. 1, and are the same as the diodes 258, 275, 277 and 292 of FIG. 4. In addition, the capacitor 374, the inductor 376, and the diode 378 of FIG. 6 are the same as the capacitor 60, the inductor 72, and the diode 56 of FIG. 1 and are the same as the capacitor 290, the inductor 268, and the diode 270 of FIG. 4.

When the terminals 354 and 356 of FIG. 6 are connected to a suitable A.C. supply, the controlled rectifiers 366 and 372 will, initially, be non-conductive; but after the terminal 354 becomes positive, a "firing" pulse will be applied to the gate-to-cathode circuit of the controlled rectifier 372. Thereupon that controlled rectifier will become conductive, and current will flow from the terminal 354 via junction 358, diode 360, junction 364, capacitor 374, junction 385, controlled rectifier 372, junctions 370 and 368, inductor 376, junctions 380 and 382, diode 386, junction 388, and load 390 to the terminal 356. That flow of current will charge the capacitor 374 and make the left-hand terminal thereof positive. If the "firing" pulse is short, as are the "firing" pulses of the control system of FIG. 1, the current flowing through the controlled rectifier 372 will decrease, as the capacitor 374 becomes charged, until that controlled rectifier again becomes non-conductive. However, if that "firing" pulse is long, as are the "firing" pulses of the control system of FIG. 4, the controlled rectifier 372 will remain conductive until after the initiation of the second half-cycle.

During the second half-cycle the terminal 356 will be positive; and the controlled rectifier 372 will be rendered conductive, either by an additional "firing" pulse where the first "firing" pulse was short or by the first "firing" pulse where that first "firing" pulse was long. As that controlled rectifier becomes conductive, current will flow from terminal 356 via load 390, junction 388, diode 384, junction 385, controlled rectifier 372, junctions 370 and 368, inductor 376, junction 380, diode 362, and junction 358 to the terminal 354; and that current flow will enable that controlled rectifier to start supplying a power pulse to the load 390. Subsequently, during that second half-cycle, a "firing" pulse will be supplied to the gate-to-cathode circuit of the controlled rectifier 366; and that controlled rectifier will then become conductive. Thereupon, current will flow from the left-hand terminal of the capacitor 374 via junction 364, controlled rectifier 366, junctions 368 and 370, controlled rectifier 372, and junction 385 to the right-hand terminal of that capacitor; and the resulting inverse flow of current through controlled rectifier 372 will render that controlled rectifier non-conductive, thereby terminating the power pulse which that controlled rectifier was supplying to the load 390. The "firing" pulse which is supplied to the gate-to-cathode circuit of the controlled rectifier 366 can be a programmed "firing" pulse or can be a condition-responsive control pulse; and hence the duration of the power pulse which the controlled rectifier 372 supplies to the load 390 can be of a programmed duration or can be of a duration which is controlled by a predetermined condition.

When the controlled rectifier 366 was rendered conductive, during the second half-cycle of the A.C. supply, it could not supply power to the load 390, because the terminal 354 is negative throughout that second half-cycle. However, current did flow from terminal 356 via load 390, junction 388, diode 384, junction 385, capacitor 374, junction 364, controlled rectifier 366, junction 368, inductor 376, junction 380, diode 362, and junction 358 to the terminal 354; and that current flow discharged the capacitor 374 and then charged that capacitor with the right-hand terminal thereof positive. If the "firing" pulse which rendered the controlled rectifier 366 conductive is short, as are the "firing" pulses of the control system of FIG. 1, the current flowing through the controlled rectifier 366 will decrease, as the capacitor 374 becomes charged, until that controlled rectifier again becomes non-conductive. However, if the "firing" pulse which rendered the controlled rectifier 366 conductive is long, as are the "firing" pulses of the control system of FIG. 4, the controlled rectifier 366 will remain conductive until after the initiation of the third half-cycle of the A.C. supply.

During the third half-cycle, the terminal 354 will again be positive and the controlled rectifier 366 will again be rendered conductive by a "firing" pulse; and current will then flow from terminal 354 via junction 358, diode 360, junction 364, controlled rectifier 366, junction 368, inductor 376, junctions 380 and 382, diode 386, junction 388, and load 390 to the terminal 356. That current flow will enable the controlled rectifier 366 to start supplying a power pulse to the load 390. Subsequently during that third half-cycle, a "firing" pulse will be applied to the gate-to-cathode circuit of the controlled rectifier 372 and will render that controlled rectifier conductive. Thereupon, the capacitor 374 will cause inverse current to flow through the controlled rectifier 366, thereby rendering that controlled rectifier non-conductive; and the power pulse which that controlled rectifier was supplying to the load 390 will be terminated. The "firing" pulse which is supplied to the gate-to-cathode circuit of the controlled rectifier 372 can be a programmed "firing" pulse or can be a condition-responsive control pulse; and hence the duration of the power pulse which the controlled rectifier 366 supplies to the load 390 can be of a programmed duration or can be of a duration which is controlled by a predetermined condition.

When the controlled rectifier 372 was rendered conductive, during the third half-cycle of the A.C. supply, it could not supply power to the load 390, because the terminal 356 is negative throughout that third half-cycle. However, current did flow from terminal 354 via junction 358, diode 360, junction 364, capacitor 374, junction 385, controlled rectifier 372, junctions 370 and 368, inductor 376, junctions 380 and 382, diode 386, junction 388, and load 390 to the terminal 356; and that current flow discharged the capacitor 374 and then charged that capacitor with the left-hand terminal thereof positive. If the "firing" pulse which rendered the controlled rectifier 372 conductive is short, as are the "firing" pulses of the control system of FIG. 1, the current flowing through the controlled rectifier 372 will decrease, as the capacitor 374 becomes charged, until that controlled rectifier again becomes non-conductive. However, if the "firing" pulse which rendered the controlled rectifier 372 conductive is long, as are the "firing" pulses of the control system of FIG. 4, the controlled rectifier 372 will remain conductive until after the initiation of the fourth half-cycle of the A.C. supply.

Subsequent half-cycles of the A.C. supply will enable the control system of FIG. 6 to provide power pulses which are similar to the power pulses that were supplied during the second and third half-cycles. This means that the control system of FIG. 6 will be able to supply power pulses which can have durations of programmed duration or have durations that are controlled by a predetermined condition.

It will be noted that in the operation of the control systems of FIGS. 1, 4 and 6, one of the controlled rectifiers serves as the commutating controlled rectifier during the positive-going half-cycles and then serves as the power-supplying controlled rectifier during the negative-going half-cycles, while the other controlled rectifier serves as the power-supplying controlled rectifier during the positive-going half-cycles and then serves as the commutating controlled rectifier during the negative-going half-cycles.

Consequently, the control systems of FIGS. 1, 4 and 6 make it possible to use just two controlled rectifiers to vary, over a wide range, the root mean square value of the current or voltage supplied to the load. Also, those control systems make it possible to terminate a power pulse at any time prior to the end of the half-cycle during which that power pulse is being supplied to the load, and thus make it possible to provide prompt and full control over the power supplied to that load.

Referring to FIG. 7, the numerals 394 and 396 denote terminals that can be connected to a suitable A.C. supply by a switch or by relay contacts, not shown. A junction 398, an inductor 400, and junctions 404, 410 and 420 connect the terminal 394 with the anode of a controlled rectifier 426. Junctions 424 and 432, and a load 434 connect the cathode of that controlled rectifier to the terminal 396. The load 434 and the junctions 432 and 424 connect the terminal 396 with the anode of a controlled rectifier 428; and junctions 422, 412 and 406, an inductor 402, and junction 398 connect the cathode of that controlled rectifier to the terminal 394. A diode 408 has the anode thereof connected to the terminal 404 and has the cathode thereof connected to the junction 398 by a junction 411. A diode 409 has the anode thereof connected to the junction 411 and has the cathode thereof connected to the junction 406. A controlled rectifier 414 has the anode thereof connected to the terminal 410 and has the cathode thereof connected to the anode of a controlled rectifier 416 by a junction 418; and the cathode of the controlled rectifier 416 is connected to the junction 412. A capacitor 430 is connected between the junctions 418 and 424; and is thus connected between the cathodes of the controlled rectifiers 414 and 426 and between the anodes of the controlled rectifiers 416 and 428.

An NPN transistor 436 has the emitter thereof connected to the cathode of the controlled rectifier 426 by junctions 448, 432 and 424; and that transistor has the collector thereof connected to the gate of the controlled rectifier 426 by the junction 446. The collector of that transistor also is connected to the junction 420 by junction 446, a resistor 438, and a junction 440. A resistor 444 is connected between the junction 440 and the base of the transistor 436 by the junction 442. The base of that transistor also is connected to the junction 418 by junction 442, resistor 454, and junction 456.

An NPN transistor 458 has the emitter thereof connected to the cathode of controlled rectifier 428 by the junction 422; and the collector of that transistor is connected to the gate of that controlled rectifier by a junction 460. The base of that transistor is connected to the junction 424 by a diode 466, a resistor 464, and junctions 450, 448 and 432. A resistor 462 is connected between the junctions 456 and 460; and a diode 452 has the cathode thereof connected to the junction 442 while it has the anode thereof connected to the junction 450.

When the terminals 394 and 396 of the control system of FIG. 7 are connected to a suitable A.C. supply, an alternating voltage will appear at the terminal 394. Initially, all of the controlled rectifiers 414, 416, 426 and 428 will be non-conductive. If the voltage at the terminal 394 is positive, current will flow via junction 398, inductor 400, junctions 404, 410, 420 and 440, resistor 444, junction 442, the base-emitter circuit of transistor 436, junctions 448 and 432, and load 434 to the terminal 396. That flow of current will render that transistor conductive; and current will immediately flow from terminal 394 via junction 398, inductor 400, junctions 404, 410, 420 and 440, resistor 438, junction 446, the collector-emitter circuit of transistor 436, junctions 448 and 432, and load 434 to the terminal 396. It will be noted that the gate-to-cathode circuit of controlled rectifier 426 is connected in parallel with the collector-emitter circuit of transistor 436; but the resistance of that collector-emitter circuit is so low, whenever that transistor is conductive, that substantially no current will flow through the gate-to-cathode circuit of controlled rectifier 426. Consequently, if the terminal 394 is positive when the terminals 394 and 396 are first connected to the A.C. supply, the controlled rectifier 426 will remain non-conductive. The transistor 458 has the base thereof connected to the terminal 396 by diode 466, resistor 464, junctions 450, 448, and 432, and load 434; and that terminal will be negative when the terminal 394 is positive. As a result, during the first half-cycle of the A.C. supply, the base of the transistor 458 will be negative; and hence that transistor will remain non-conductive. The anode of the controlled rectifier 428 is connected to the terminal 396 by junctions 424 and 432 and load 434; and, since that terminal is negative, that controlled rectifier will remain non-conductive throughout the first half-cycle of the A.C. supply.

Subsequently during that first half-cycle of the A.C. supply, a "firing" pulse will be applied to the gate-to-cathode circuit of the controlled rectifier 414; and thereupon that controlled rectifier will become conductive—current flowing from terminal 394 via junction 398, inductor 400, junctions 404 and 410, controlled rectifier 414, junction 418, capacitor 430, junctions 424 and 432, and load 434 to the terminal 396. That flow of current will charge the capacitor 430 and make the left-hand terminal of that capacitor positive.

All of this means that during the first half-cycle of the A.C. supply, the transistor 436 was rendered conductive and thus kept the controlled rectifier 426 from becoming conductive. The transistor 458 and the controlled rectifier 428 remained non-conductive throughout that first half-cycle. Subsequently, during that first half-cycle, a "firing" pulse was applied to the gate-to-cathode circuit of the controlled rectifier 414 to render that controlled rectifier conductive and thereby enable the A.C. supply to charge the capacitor 430 with its left-hand terminal positive.

During the second half-cycle of the A.C. supply, the voltage at the terminal 394 will be negative and the voltage at the terminal 396 will be positive. The voltage between the terminals 396 and 394 will be applied across the base-emitter circuit of the transistor 458—the terminal 396 being connected to the base of that transistor by load 434, junctions 432, 448 and 450, resistor 464 and diode 466, and the terminal 394 being connected to the emitter of that transistor by junction 398, inductor 402, and junctions 406, 412, and 422. However, at the beginning of the second half-cycle of the A.C. supply, the voltage between terminals 396 and 394 will be substantially zero; and hence no current will flow through the base-emitter circuit of the transistor 458, and that transistor will remain non-conductive. This means that the transistor 458 will not permit the capacitor 430 to pass current through it; and, instead, current will flow from the left-hand terminal of that capacitor via junctions 418 and 456, resistor 462, junction 460, the gate-to-cathode circuit of controlled rectifier 428, junctions 422, 412 and 406, inductor 402, junction 398, terminal 394, the A.C. supply, terminal 396, load 434, and junctions 432 and 424 to the right-hand terminal of that capacitor. That flow of current through the gate-to-cathode circuit of controlled rectifier 428 will render that controlled rectifier conductive; and thereupon current will flow from terminal 396 via load 434, junctions 432 and 424, controlled rectifier 428, junctions 422, 412 and 406, inductor 402, and junction 398 to the terminal 394. That flow of current will enable the controlled rectifier 428 to start supplying a power pulse to the load 434.

Once the controlled rectifier 428 has been rendered conductive, it will continue to supply power to the load 434 until it is rendered non-conductive. That controlled rectifier will be rendered non-conductive later in the second half-cycle of the A.C. supply by the "firing" of the controlled rectifier 416. Specifically, a "firing" pulse will be applied to the gate-to-cathode circuit of the controlled rectifier 416 and that controlled rectifier will become conductive; and, thereupon, the charge on the capacitor 430 will force an inverse current to flow through the controlled rectifier 428 and render that controlled rectifier non-conductive. At such time, the power pulse being supplied to the load 434 by the controlled rectifier 428 will be terminated.

The controlled rectifier 416 will continue to be conductive, and current will flow from terminal 396 via load 434, junctions 432 and 424, capacitor 430, junction 418, controlled rectifier 416, junctions 412 and 406, inductor 402, and junction 398 to the terminal 394; and that flow of current will cause the capacitor 430 to discharge and then charge with the right-hand terminal positive. As the capacitor 430 becomes charged, the current flowing through the controlled rectifier 416 will decrease until that controlled rectifier again becomes non-conductive.

During the second half-cycle of the A.C. supply, the negative voltage at the terminal 394 will be applied to the anode of the controlled rectifier 426 and will keep that controlled rectifier non-conductive. Also, the negative voltage at the terminal 394 will be applied to the base of the transistor 436 and will render that transistor non-conductive.

During the third half-cycle of the A.C. supply, the terminal 394 will again be positive; and the voltage across the terminals 394 and 396 will again be applied across the base-emitter circuit of the transistor 436. However, at the beginning of that half-cycle, the voltage across the terminals 394 and 396 will be substantially zero; and hence no current will flow through the base-emitter circuit of the transistor 436, and that transistor will initially be non-conductive. At this time, the charge on the capacitor 430 will force current to flow through the diode 452—current flowing from the right-hand terminal of that capacitor via junctions 424, 432, 448 and 450, diode 452, junction 442, resistor 454, and junctions 456 and 418 to the left-hand terminal of that capacitor. The resulting voltage drop across the diode 452 will make the emitter of the transistor 436 positive relative to the base of that transistor and will thereby keep that transistor non-conductive. As the voltage across the terminals 394 and 396 increases, during the third half-cycle of the A.C. supply, current will flow from terminal 394 via junction 398, inductor 400, junctions 404, 410, 420 and 440, resistor 438, junction 446, the gate-to-cathode circuit of controlled rectifier 426, junctions 424 and 432, and load 434 to the terminal 396. That current flow through that gate-to-cathode circuit will render that controlled rectifier conductive; and current will then flow from terminal 394 via junction 398, inductor 400, junctions 404, 410, and 420, controlled rectifier 426, junctions 424 and 432, and load 434 to the terminal 396. This means that the controlled rectifier 426 will start supplying a power pulse to the load 434; and it will continue to supply that pulse to that load until it is rendered non-conductive. That controlled rectifier will be rendered non-conductive later in the third half-cycle when a "firing" pulse is applied to the gate-to-cathode circuit of the controlled rectifier 414. Specifically, when a "firing" pulse is applied to the gate-to-cathode circuit of the controlled rectifier 414, that controlled rectifier will become conductive; and the charge on the capacitor 430 will cause an inverse current to flow through the controlled rectifier 426—current flowing from the right-hand terminal of that capacitor via junction 424, controlled rectifier 426, junctions 420 and 410, controlled rectifier 414, and junction 418 to the left-hand terminal of that capacitor. That flow of inverse current through the controlled rectifier 426 will render that controlled rectifier non-conductive; and, as that controlled rectifier becomes non-conductive, the power pulse which that controlled rectifier was supplying to the load 434 will be terminated.

The controlled rectifier 414 will remain conductive, and current will flow from the terminal 394 via junction 398, inductor 400, junctions 404 and 410, controlled rectifier 414, junction 418, capacitor 430, junctions 424 and 432, and load 434 to the terminal 396. That flow of current will discharge the capacitor 430 and then charge that capacitor with the left-hand terminal thereof positive. As that capacitor charges, the current flowing through the controlled rectifier 414 will decrease until that controlled rectifier again becomes non-conductive.

During the fourth half-cycle of the A.C. supply, the terminal 394 will again be negative and the terminal 396 will again be positive; and, as described hereinbefore in connection with the second half-cycle of the A.C. supply, the transistor 458 will initially be non-conductive and the charge on the capacitor 430 will cause current to flow through the gate-to-cathode circuit of the controlled rectifier 428 and render that controlled rectifier conductive. At such time, the controlled rectifier 428 will begin supplying a power pulse to the load 434. Subsequently during that fourth half-cycle, a "firing" pulse will be applied to the gate-to-cathode circuit of the controlled rectifier 416 and render that controlled rectifier conductive. The charge on the capacitor 430 will then cause an inverse current to flow through the controlled rectifier 428 and render that controlled rectifier non-conductive, thereby terminating the power pulse which that controlled rectifier was supplying to the load 434. Current will continue to flow through the controlled rectifier 416 to discharge the capacitor 430 and then charge that capacitor with the right-hand terminal thereof positive.

Successive half-cycles of the A.C. supply will cause the control system of FIG. 7 to supply power pulses to the load 434 which are similar to the power pulses supplied to that load during the third and second half-cycles of the A.C. supply. In the odd-numbered or positive going half-cycles, the power-supplying controlled rectifier 426 will be rendered conductive close to the beginnings of those half-cycles and will then be rendered non-conductive later in those half-cycles by the "firing" of the commutating controlled rectifier 414. In the even-numbered or negative-going half-cycles, the power-supplying controlled rectifier 428 will be rendered conductive close to the beginnings of those half-cycles and will then be rendered non-conductive later in those half-cycles by the "firing" of the commutating controlled rectifier 416.

The "firing" pulses applied to the gate-to-cathode circuits of the commutating controlled rectifiers 414 and 416 can be applied at predetermined intervals on a programmed basis, can be applied as required by some condition, or can be applied on a programmed basis under normal operating conditions and applied earlier in the half-cycles where required by said condition under abnormal operating conditions. These "firing" pulses can be generated by the arrangements shown in FIGS. 1 and 4 or by any other suitable arrangement.

In the foregoing description of the operation of the control system of FIG. 7 it was assumed that the terminal 394 was positive during the first half-cycle of the A.C. supply. However, if that terminal had been negative during that first half-cycle, the voltage across the terminals 394 and 396 would have caused current to flow through the base-emitter circuit of the transistor 458—current flowing from terminal 396 via load 434, junctions 432, 448 and 450, resistor 464, diode 466, the base-emitter circuit of that transistor, junctions 422, 412 and 406, inductor 402, and junction 398 to the terminal 394. That current flow would have rendered the transistor 458 conductive and would have effectively "short-circuited" the gate-to-cathode circuit of the controlled rectifier 428, thereby keeping that controlled rectifier from being rendered conductive. Subsequently during that first half-cycle, a "firing" pulse would have rendered the controlled rectifier 416 conductive; and that controlled rectifier would then have permitted the capacitor 430 to charge with its right-hand terminal positive. The second half-cycle of the A.C. supply would have been similar to the third half-cycle described hereinbefore with regard to the control system of FIG. 7, and the third half-cycle of that A.C. supply would have been similar to the fourth half-cycle described hereinbefore with regard to the control system of FIG. 7.

In the control system of FIG. 7, the inductors 400 and 402 perform the same function that is performed by the inductors 72, 268 and 376, respectively, of the control systems of FIGS. 1, 4 and 6. Specifically, those inductors limit the flow of current when a power-supplying controlled rectifier is being rendered non-conductive and also control the rate at which the capacitor 430 discharges. The diodes 408 and 409 in FIG. 7 perform the same function that is performed by the diodes 56, 270 and 378, respectively, of the control systems of FIGS. 1, 4 and 6. Specifically, those diodes keep the voltages across the inductors 402 and 400 from becoming excessively large when the upper ends of those inductors are positive.

In the various control systems described hereinbefore, the capacitors are connected across the A.C. supplies by the commutating controlled rectifiers; and hence the voltages across those capacitors can not exceed the peak voltages of those A.C. supplies. Further, because the power-supplying controlled rectifiers are rendered conductive during the early portions of the half-cycles of the A.C. supply, those controlled rectifiers are rendered conductive when the effective voltages applied to the input terminals are substantially zero; and this means that the power-supplying controlled rectifiers are rendered conductive when the voltages applied to those controlled rectifiers do not exceed the peak voltages of the A.C. supplies. In this way, the present invention protects the power-supplying controlled rectifiers thereof against the application of excessive voltages thereto.

Controlled rectifiers are very useful and desirable as the control elements in the control systems provided by the present invention. However, if desired, thyratrons, four layer diodes, and similar control elements could be incorporated in appropriate control systems that would be similar to the control systems provided by the present invention.

The initial cost of the commutating controlled rectifiers 414 and 416 of FIG. 7 will be greater than the initial cost of the four diodes 44, 86, 90 and 46 of FIG. 1, or of the four diodes 258, 275, 277 and 292 of FIG. 4, or of the four diodes 360, 384, 386 and 362 of FIG. 6. However, those commutating controlled rectifiers need not have large current-carrying capacities, and can thus be less expensive than the power supplying controlled rectifiers 426 and 428 of FIG. 7, or the controlled rectifiers 54 and 70 of FIG. 1, or the controlled rectifiers 262 and 288 of FIG. 4, or the controlled rectifiers 366 and 372 of FIG. 6. Furthermore, the commutating controlled rectifiers 414 and 416 of the control system of FIG. 7 will reduce the amount of power required to operate that control system below the amount of power required to operate the control systems of FIGS. 1, 4 and 6; because those commutating controlled rectifiers eliminate the voltage drops across the four diodes of the control systems of FIGS. 1, 4 and 6.

In the operation of the control system of FIG. 7, it would be possible to apply "firing" pulses to the commutating controlled rectifiers 414 and 416 simultaneously and yet not adversely affect the operation of that control system. Specifically, if a "firing" pulse were applied to the commutating control rectifier 416 at the same time a "firing" pulse was being supplied to the controlled rectifier 414, the charge on the capacitor 430 would still cause an inverse current to flow through the controlled rectifier 426 and render that controlled rectifier non-conductive. Furthermore, current would continue to flow through the commutating controlled rectifier 414 to discharge the capacitor 430 and then charge that capacitor with the left-hand terminal thereof positive. Current would not flow through the commutating controlled rectifier 416 even though that controlled rectifier was rendered conductive; because the power-supplying controlled rectifier 428 would be non-conductive. Similarly, if a "firing" pulse were to be applied to the commutating controlled rectifier 414 when a "firing" pulse was being applied to the commutating controlled rectifier 416, no adverse action would result. Specifically, the commutating controlled rectifier 416 would permit the charge on the capacitor 430 to cause inverse current to flow through the controlled rectifier 428 and render that controlled rectifier non-conductive. Further, the commutating controlled rectifier 416 would permit the capacitor 430 to discharge and then charge with the right-hand terminal thereof positive. Although the commutating controlled rectifier 414 would become conductive, no current would flow through it because the power-supplying controlled rectifier 426 would be non-conductive.

Each of the control systems provided by the present invention makes it possible for commercial frequency A.C. supplies to provide controllable power for loads. Further, each of those control systems makes it possible, at any instant, to terminate the power pulses which are being supplied to those loads. As a result, those control systems are particularly useful in dimmers for incandescent lamps, in current regulators, and in push-pull amplifiers.

While FIG. 6 discloses the essential portion of the control systems of FIGS. 1 and 4, the diode 378 in FIG. 6 is not essential. Similarly, the diodes 56 and 270 in FIGS. 1 and 4 are not essential. Any one of those three diodes could be replaced by a plurality of serially-connected diodes or by a serially-connected diode and resistor. Furthermore, any one of those three diodes could be completely eliminated and not replaced by any component or components.

The function of diode 378 is to dissipate the inductive energy that is stored in the inductor 376 by the A.C. supply when that A.C. supply causes current to flow through capacitor 374, through a commutating controlled rectifier, and then through that inductor. If that diode was not present and if a plurality of serially-connected diodes or a serially-connected diode and resistor were not present, that inductive energy would cause current to flow through diodes 386 and 384 and controlled rectifier 372, if that controlled rectifier was the commutating rectifier, or would cause current to flow through diodes 362 and 360 and controlled rectifier 366, if that controlled rectifier was the commutating rectifier. Any such current flow would increase the heating of those controlled rectifiers; and it is to obviate such increased heating that the diode 378 is provided. However, if such increased heating is acceptable, the diode 378 can be completely eliminated. Similarly, if increased heating of the controlled rectifiers 54 and 70 of FIG. 1 and of the controlled rectifiers 262 and 288 of FIG. 4 is acceptable, the diode 56 and the diode 270 could be completely eliminated.

If the A.C. supply or the load in FIG. 6 has appreciable inductance and if the diode 378 is removed, just one "firing" signal per half-cycle of the A.C. supply will be needed during normal operation of the control system of FIG. 6—even if that "firing" signal is short. Specifically, if the A.C. supply or the load in FIG. 6 has appreciable inductance, if the diode 378 is removed, if a signal source, which can supply commutating signals as well as normal "firing" signals, is connected to the gates of the controlled rectifiers 366 and 372, if the terminal 354 is negative, and if a commutating signal is applied to the gate-to-cathode circuit of the controlled rectifier 366 shortly before the beginning of a half-cycle of the A.C. supply, current will flow from terminal 356 via load 390, junction 388, diode 384, junction 385, capacitor 374, junction 364, controlled rectifier 366, junction 368, inductor 376, junction 380, diode 362, and junction 358 to terminal 354. That flow of current will charge the capacitor 374 with the right-hand terminal thereof positive; and, as that capacitor becomes charged, the current flowing through the controlled rectifier 366 will decrease until that controlled rectifier again becomes non-conductive.

At the beginning of the said half-cycle of the A.C. supply, the terminal 354 will become positive; and, shortly thereafter, a "firing" signal will be supplied to the gate-to-cathode circuit of the controlled rectifier 366 to render that controlled rectifier conductive. Current will then flow from terminal 354 via junction 358, diode 360, junction 364, controlled rectifier 366, junction 368, inductor 376, junction 380, diode 386, junction 388, and load 390 to the terminal 356. That flow of current will enable the controlled rectifier 366 to start supplying a power pulse to the load 390; and that controlled rectifier will supply that power pulse to that load throughout the rest of that half-cycle.

When, at the end of that half-cycle, the voltage across the terminals 354 and 356 tends to drop to zero, the inductance of the A.C. supply or of the load will cause current to continue to flow from terminal 354 toward the terminal 356; and that current will continue to flow until after the beginning of the second half-cycle of the A.C. supply. At the beginning of that second half-cycle, that current will be flowing through the controlled rectifier 366; but when, shortly after the beginning of that second half-cycle, a "firing" signal is applied to the gate-to-cathode circuit of the controlled rectifier 372, the latter controlled rectifier will become conductive and will permit the charge on the capacitor 374 to cause inverse current to flow through the controlled rectifier 366. Specifically, current will flow from the right-hand terminal of that capacitor via junction 385, controlled rectifier 372, junction 368, controlled rectifier 366, and junction 364 to the left-hand terminal of that capacitor; and that inverse flow of current will render the controlled rectifier 366 non-conductive. Consequently, the current which must, for a short time, continue to flow from terminal 354 toward terminal 356, because of the inductance of the A.C. supply or of the load, must flow from terminal 354 via junction 358, diode 360, junction 364, capacitor 374, junction 385, controlled rectifier 372, junction 368, inductor 376, junction 380, diode 386, junction 388, and load 390 to the terminal 356. That flow of current through the capacitor 374 will discharge that capacitor and then charge that capacitor with the left-hand terminal thereof positive.

While the inductance of the A.C. supply or of the load is causing current to flow successively through the controlled rectifiers 366 and 372, the inductive energy which was stored within the inductor 376 during the first half-cycle of the A.C. supply will cause current to flow through those controlled rectifiers—some current flowing from the lower end of that inductor via junction 380, diode 362, junction 358, diode 360, junction 364, controlled rectifier 366, and junction 368 to the upper end of that conductor, and other of that current flowing from the lower end of that inductor via junction 380, diode 386, junction 388, diode 384, controlled rectifier 372, and junction 368 to the upper end of that inductor. This means that the controlled rectifier 372 will be kept conductive until the terminal 356 becomes sufficiently positive to enable the controlled rectifier 372 to start supplying a power pulse to the load 390—current flowing from terminal 356 via load 390, junction 388, diode 384, junction 385, controlled rectifier 372, junction 368, inductor 376, junction 380, diode 362, and junction 358 to the terminal 354. The controlled rectifier 372 will supply that power pulse to that load throughout the rest of the second half-cycle of the A.C. supply.

When, at the end of that second half-cycle, the voltage across the terminals 354 and 356 tends to drop to zero, the inductance of the A.C. supply or of the load will cause current to continue to flow from terminal 356 toward the terminal 354; and that current will continue to flow until after the beginning of the third half-cycle of the A.C. supply. At the beginning of that third half-cycle, that current will be flowing through the controlled rectifier 372; but when, shortly after the beginning of that third half-cycle, a "firing" signal is applied to the gate-to-cathode circuit of the controlled rectifier 366, the latter controlled rectifier will become conductive and will permit the charge on the capacitor 374 to render the controlled rectifier 372 non-conductive by passing inverse current through it. Thereafter the current, due to the inductive energy in the A.C. supply or in the load 390, will flow through capacitor 374 and controlled rectifier 366; and that current will discharge that capacitor and then charge that capacitor with the right-hand end thereof positive.

While the inductance of the A.C. supply or of the load is causing current to flow successively through the controlled rectifiers 372 and 366, the inductive energy which was stored within the inductor 376 during the second half-cycle of the A.C. supply will cause current to flow through those controlled rectifiers—some current flowing from the lower end of that inductor via junction 380, diode 386, junction 388, diode 384, junction 385, controlled rectifier 372, and junction 368 to the upper end of that inductor, and other of that current flowing from the lower end of that inductor via junction 380, diode 362, junction 358, diode 360, junction 364, controlled rectifier 366, and junction 368 to the upper end of that inductor. This means that the controlled rectifier 372 will be kept conductive until the controlled rectifier 366 is rendered conductive, and that the controlled rectifier 366 will then be kept conductive until the terminal 354 becomes sufficiently positive to enable the controlled rectifier 366 to start supplying a power pulse to the load 390. The controlled rectifier 366 will supply that power pulse to that load throughout the rest of the third half-cycle of the A.C. supply.

When, at the end of that third half-cycle, the voltage across the terminals 354 and 356 tends to drop to zero, the inductance of the A.C. supply or of the load will cause current to continue to flow from terminal 354 toward the terminal 356; and that current will continue to flow until after the beginning of the fourth half-cycle of the A.C. supply. At the beginning of that fourth half-cycle, that current will be flowing through the controlled rectifier 366; but when, shortly after the beginning of that fourth half-cycle, a "firing" signal is applied to the gate-to-cathode circuit of the controlled rectifier 372, the latter controlled rectifier will become conductive and will permit the charge on the capacitor 374 to render the controlled rectifier 366 non-conductive by passing inverse current through it. Thereafter the current, due to the inductive energy in the A.C. supply or in the load 390, will flow through capacitor 374 and controlled rectifier 372; and that current will discharge that capacitor and then charge that capacitor with the left-hand end thereof positive.

While the inductance of the A.C. supply or of the load is causing current to flow successively through the controlled rectifiers 366 and 372, the inductive energy which was stored within the inductor 376 during the third half-cycle of the A.C. supply will cause current to flow through those controlled rectifiers—some current flowing from the lower end of that inductor via junction 380, diode 362, junction 358, diode 360, junction 364, controlled rectifier 366, and junction 368 to the upper end of that inductor, and other of that current flowing from the lower end of that inductor via junction 380, diode 386, junction 388, diode 384, junction 385, controlled rectifier 372, and junction 368 to the upper end of that inductor. This means that the controlled rectifier 366 will be kept conductive until the controlled rectifier 372 is rendered conductive, and that the controlled rectifier 372 will then be kept conductive until the terminal 356 becomes sufficiently positive to enable the controlled rectifier 372 to start supplying a power pulse to the load 390. The controlled rectifier 372 will supply that power pulse to that load throughout the rest of the fourth half-cycle of the A.C. supply.

Subsequent odd-numbered half-cycles will be similar to the third half-cycle, and subsequent even-numbered half-cycles will be similar to the fourth half-cycle. This means that under normal conditions of operation, where the A.C. supply or the load 390 has appreciable inductance and the diode 378 has been removed, the control system of FIG. 6 will respond to a single "firing" signal per half-cycle to render the conductive controlled rectifier non-conductive and to render the non-conductive controlled rectifier conductive.

In the event a predetermined condition occurs and causes a commutation signal to be applied to the gate-to-cathode circuit of the commutating controlled rectifier of the control system of FIG. 6 during each half-cycle of the A.C. supply, the power pulse being supplied by the power-supplying controlled rectifier will be terminated prior to the end of that half-cycle. If it is assumed that the controlled rectifier 366 is the power-supplying controlled rectifier in a given half-cycle, that the capacitor 374 has the right-hand end thereof positive, and that a commutating signal is supplied to the gate-to-cathode circuit of the controlled rectifier 372 before the end of that half-cycle, the latter controlled rectifier will become conductive and permit the charge on the capacitor 374 to cause inverse current to flow through the controlled rectifier 366 to render that controlled rectifier non-conductive. The controlled rectifier 372 will then permit the A.C. supply to discharge the capacitor 376 and then charge that capacitor with the left-hand end thereof positive. Also, the controlled rectifier 372 will permit the inductive energy, which was stored in the inductor 376 during the preceding half-cycle to be dissipated—current flowing from the lower end of that inductor via junction 380, diode 386, junction 388, diode 384, junction 385, controlled rectifier 372, and junction 368 to the upper end of that inductor. If, prior to the beginning of the next half-cycle, the current flowing through the controlled rectifier 372 decreases sufficiently, that controlled rectifier will again become non-conductive. This means that during the said half-cycle of the A.C. supply, the controlled rectifier 366 was rendered conductive and started supplying a power pulse to the load 390, but that the controlled rectifier 372 was rendered conductive and enabled the capacitor 374 to render the controlled rectifier 366 non-conductive to terminate that power pulse.

After the beginning of the next half-cycle, a "firing" signal will render the controlled rectifier 372 conductive, once again, if that controlled rectifier had been permitted to become non-conductive; and that controlled rectifier will start supplying a power pulse to the load. If the predetermined condition, that occurred during the preceding half-cycle, still exists, a commutating signal will then be supplied to the gate-to-cathode circuit of the controlled rectifier 366. That controlled rectifier will then become conductive and permit the charge on the capacitor 374 to cause inverse current to flow through the controlled rectifier 372 to render that controlled rectifier non-conductive. The controlled rectifier 366 will then permit the A.C. supply to discharge the capacitor 374 and then charge that capacitor with the right-hand end thereof positive. Also, the controlled rectifier 366 will permit the inductive energy, which was stored in the inductor 376 during the preceding half-cycle to be dissipated. This means that during the second half-cycle of the A.C. supply, the controlled rectifier 372 was rendered conductive and started supplying a power pulse to the load 390, but that the controlled rectifier 366 was rendered conductive and enabled the capacitor 374 to render the controlled rectifier 372 non-conductive to terminate that power pulse. As long as that predetermined condition exists, abbreviated power pulses will be supplied to the load 390; but when that condition disappears, full power pulses will be supplied to that load.

It will be noted that the signal source was used to supply a commutating signal to the control system at the time the terminals 354 and 356 were first connected to the A.C. supply; and that commutating signal was used to charge the capacitor 374. Thereafter, under normal operating conditions, further commutating signals were not needed because that capacitor was automatically discharged and then charged in the opposite direction after the power-supplying controlled rectifier was rendered non-conductive. As a result, under normal operating conditions, just one "firing" signal per half-cycle was needed to render the commutating controlled rectifier conductive and also to enable that controlled rectifier to start supplying a power pulse to the load—and that was the case even if that "firing" signal was short. Further, it should be noted that when the said predetermined condition existed, commutating signals were supplied to the commutating controlled rectifiers to enable the control system of FIG. 6 to abbreviate the power pulses which it supplied to the load. In this direct and simple way, the control system of FIG. 6 can be stripped of its diode 378 and can be provided with a very simple signal source and yet provide the desired control over the power pulses supplied to the load 390.

Whereas the drawing and accompanying description have shown and described several preferred forms of the present invention, it should be apparent to those skilled in the art that various changes could be made in the form of the invention without affecting the scope thereof.

What I claim is:

1. A control system that can be connected to an A.C. supply and to a load to provide power pulses for said load and that comprises:
   (a) a controlled rectifier that can be rendered conductive to start supplying a power pulse to said load,
   (b) a second controlled rectifier that can be rendered conductive to start supplying a second power pulse to said load,
   (c) a capacitor,
   (d) said capacitor being adapted to selectively cause inverse current to flow through the first said controlled rectifier and thereby render said first said controlled rectifier non-conductive and to selectively cause inverse current to flow through said second controlled rectifier and thereby render said second controlled rectifier non-conductive,
   (e) the first said controlled rectifier being rendered conductive to start supplying the first said power pulse to said load at the start of positive-going half-cycles of said A.C. supply,
   (f) said second controlled rectifier becoming conductive during said positive-going half-cycles of said A.C. supply to enable said capacitor to cause inverse current to flow through said first said controlled rectifier and thereby render said first said controlled rectifier non-conductive and to thereafter enable said capacitor to discharge and then charge in the opposite direction,
   (g) said second controlled rectifier being rendered conductive to start supplying said second power pulse to said load at the start of negative-going half-cycles of said A.C. supply,
   (h) the first said controlled rectifier becoming conductive during said negative-going half-cycles of said A.C. supply to enable said capacitor to cause inverse current to flow through said second controlled rectifier and thereby render said second controlled rectifier non-conductive and to thereafter enable said capacitor to discharge and then charge in its initial direction,
   (i) a signal source that can supply "turn on" signals to the first said controlled rectifier during positive-going half-cycles of said A.C. supply to enable said first said controlled rectifier to serve as a power-supplying controlled rectifier and that can supply "turn on" signals to said second controlled rectifier during negative-going half-cycles of said A.C. supply to enable said second controlled rectifier to serve as a power-supplying controlled rectifier,
   (j) a second signal source that can supply commutating signals to said second controlled rectifier during said positive-going half-cycles of said A.C. supply to cause said second controlled rectifier to serve as a commutating controlled rectifier as by rendering said second controlled rectifier conductive and thereby enabling said capacitor to pass inverse current through said first said controlled rectifier to render said first said controlled rectifier non-conductive and that can supply commutating signals to said first said controlled rectifier during said negative-going half-cycles of said A.C. supply to cause said first said controlled rectifier to serve as a commutating controlled rectifier as by rendering said first said controlled rectifier conductive and thereby enabling said capacitor to pass inverse current through said second controlled rectifier to render said second controlled rectifier non-conductive,
   (k) the first said signal source supplying said "turn on" signals close to the beginnings of said half-cycles of said A.C. supply,
   (l) said second signal source rendering said commutating controlled rectifiers conductive before the ends of said half-cycles of said A.C. supply,
   (m) said second signal source being adapted to vary the time interval between said "turn on" signals and the rendering of said commutating controlled rectifiers conductive.

2. A control system that can be connected to an A.C. supply and to a load to provide power pulses for said load and that comprises:
   (a) a controlled rectifier that can be rendered conductive to start supplying a power pulse to said load,
   (b) a second controlled rectifier that can be rendered conductive to start supplying a second power pulse to said load,
   (c) a capacitor,
   (d) said capacitor being adapted to selectively cause inverse current to flow through the first said controlled rectifier and thereby render said first said controlled rectifier non-conductive and to selectively cause inverse current to flow through said second controlled rectifier and thereby render said second controlled rectifier non-conductive,
   (e) the first said controlled rectifier being rendered conductive to start supplying the first said power pulse to said load at the start of positive-going half-cycles of said A.C. supply,
   (f) said second controlled rectifier becoming conductive during said positive-going half-cycles of said A.C. supply to enable said capacitor to cause inverse current to flow through said first said controlled rectifier and thereby render said first said controlled rectifier non-conductive and to thereafter enable said capacitor to discharge and then charge in the opposite direction,
   (g) said second controlled rectifier being rendered conductive to start supplying said second power pulse to said load at the start of negative-going half-cycles of said A.C. supply,
   (h) the first said controlled rectifier becoming conductive during said negative-going half-cycles of said A.C. supply to enable said capacitor to cause inverse current to flow through said second controlled rectifier and thereby render said second controlled rectifier non-conductive and to thereafter enable said capacitor to discharge and then charge in its initial direction,
   (i) a signal source than can suply "turn on" signals to the first said controlled rectifier during positive-going half-cycles of said A.C. supply to enable said first said controlled rectifier to serve as a power-supplying controlled rectifier and that can supply "turn on" signals to said second controlled rectifier during negative-going half-cycles of said A.C. supply to enable said second controlled rectifier to serve as a power-supplying controlled rectifier, (j) a second signal source that can supply commutating signals to said second controlled rectifier during said positive-going half-cycles of said A.C. supply to cause said second controlled rectifier to serve as a commutating controlled rectifier as by rendering said second controlled rectifier conductive and thereby enabling said capacitor to pass inverse current through said first said controlled rectifier to render said first said controlled rectifier non-conductive and that can supply commutating signals to said first said controlled rectifier during said negative-going half-cycles of said A.C. supply to cause said first said controlled rectifier during said negative-going controlled rectifier as by rendering said first said controlled rectifier conductive and thereby enabling said capacitor to pass inverse current through said second controlled rectifier to render said second controlled rectifier non-conductive, (k) said second signal source rendering said commutating controlled rectifiers conductive before the ends of said half-cycles of said A.C. supply, 3. A control system that can be connected to a source of A.C. power and to a load to provide power pulses for said load and that comprises:

(a) a selectively-conductive control element that, as the alternating current from said source of A.C. power passes through zero in the positive-going direction, becomes conductive and starts supplying a power pulse to said load, (b) said selectively-conductive control element subsequently, at a predetermined adjustable point prior to the time the said alternating current from said source of A.C. power again passes through zero, responding to a signal to become non-conductive and thereby terminate said power pulse, (c) a second selectively-conductive control element that as the alternating current from said source of A.C. power passes through zero in the negative-going direction, becomes conductive and starts supplying a second power pulse to said load, (d) said second selectively-conductive control element subsequently, at a further predetermined adjustable point prior to the time the said alternating current from said source of A.C. power again passes through zero, responding to a signal to become non-conductive and thereby terminate said second power pulse, (e) said control system being adapted, on a recurrent basis, to cause the first said selectively-conductive control element to start supplying a power pulse to said load at the start of a positive-going half-cycle as the alternating current from said source of A.C. power passes through zero in the positive-going direction, to subsequently render said first said selectively-conductive control element non-conductive and thereby terminate said power pulse at the first said predetermined adjustable point, to provide an adjustable time interval between the termination of said power pulse and the initiation of a second power pulse, to cause said second selectively-conductive control element to start supplying said second power pulse to said load at the start of a negative-going half-cycle as the alternating current from said source of A.C. power passes through zero in the negative-going direction, to subsequently render said second selectively-conductive control element non-conductive at said further predetermined adjustable point, and to provide an adjustable time interval between the termination of said second power pulse and a further power pulse from said first said selectively-conductive control element.

4. A control system that can be connected to a source of A.C. power and to a load to provide power pulses for said load and that comprises:

(a) a selectively-conductive control element that can, immediately after the beginning of a positive-going half-cycle of said source of A.C. power, respond to a signal to become conductive and start supplying a power pulse to said load, (b) said selectively-conductive control element subsequently, at a later point during said positive-going half-cycle of said source of A.C. power, responding to a signal to become non-conductive and thereby terminate said power pulse, and (c) a second selectively-conductive control element that can, immediately after the beginning of a negative-going half-cycle of said source of A.C. power, respond to a signal to become conductive and start supplying a second power pulse to said load, (d) said second selectively-conductive control element subsequently, at a later point during said negative-going half-cycle of said source of A.C. power, responding to a signal to become non-conductive and thereby terminate said second power pulse, (e) said control system being adapted, on a recurrent basis, to cause the first said selectively-conductive control element to start supplying a power pulse to said load at the beginning of a positive-going half-cycle of said source of A.C. power, to subsequently render said first said selectively-conductive control element non-conductive and thereby terminate said power pulse at said later point during said positive-going half-cycle of said source of A.C. power, to provide an adjustable time interval between the termination of said power pulse and the initiation of a second power pulse, to cause said second selectively-conductive control element to start supplying said second power pulse to said load at the beginning of a negative-going half-cycle of said source of A.C. power, to subsequently render said second selectively-conductive control element non-conductive at said later point during said negative-going half-cycle of said source of A.C. power, and to provide an adjustable time interval between the termination of said second power pulse and a further power pulse from said first said selectively-conductive control element, (f) the time interval between said signals, to which said first said selectively-conductive control element responds, being variable in accordance with a predetermined condition.

(g) the time interval between said signals, to which said second selectively-conductive control element responds, being variable in accordance with said predetermined condition, whereby the durations of the first said and said second power pulses can be varied in accordance with said predetermined condition.

5. A control system that can be connected to a source of A.C. power and to a load to provide power pulses for said load and that comprises:

(a) said source of A.C. power supplying an A.C. voltage that varies between zero and a peak value, (b) a selectively-conductive control element that is connectable to said source of A.C. power and that can respond to a conduction-inducing signal during a positive-going half-cycle to become conductive and start supplying a power pulse to said load, (c) a second selectively-conductive control element that is connectable to said source of A.C. power and that can respond to a second conduction-inducing signal during a negative-going half-cycle to become conductive and start supplying a second power pulse to said load, (d) said first conduction-inducing signal being supplied to said first selectively-conductive control element during said positive-going half-cycle of the alternating current from said source of A.C. power and as said alternating current passes through zero, and thus at a time when the voltage of said source of A.C. power is well below said peak voltage and is close to zero, (e) said second conduction-inducing signal being supplied to said second selectively-conductive control element during said negative-going half-cycle of the alternating current from said source of A.C. power and as said alternating current passes through zero, and thus at a time when the voltage of said source of A.C. power is well below said peak voltage and is close to zero, (f) said second selectively-conductive control element subsequently, during said positive-going half-cycle of said alternating current from said source of A.C. power, responding to a third signal to act as a commutating selectively-conductive control element to supply a quenching signal to said first selectively-conductive control element and cause it to become non-conductive and thereby terminate said power pulse, (g) said first selectively-conductive control element subsequently, during said negative-going half-cycle of said alternating current from said source of A.C. power, responding to a fourth signal to act as a commutating selectively-conductive control element to supply a quenching signal to said second selectively-conductive control element and cause it to become non-conductive and thereby terminate said second power pulse, and (h) a signal source that can initiate the supplying of said conduction-inducing, third and fourth, and quenching signals to said selectively-conductive control elements, (i) said signal source initiating the supplying of said quenching signals to said selectively-conductive control elements during said half-cycles of said alternating current from said source of A.C. power only after said voltage of said source of A.C. power has changed but before said voltage of said source of A.C. power has reached zero, (j) said signal source being adapted to vary the time between the initiation of said conduction-inducing signals and the succeeding quenching signals and thereby vary the "on" times of said selectively-conductive control elements.

6. A control system that can be connected to an A.C. supply and to a load to provide power pulses for said load and that comprises:

(a) a first selectively-conductive control element that is connectable to said A.C. supply and that can respond to a first conduction-inducing signal to become conductive and start supplying a power pulse to said load, (b) a second selectively-conductive control element that can respond to a second conduction-inducing signal to become conductive and start supplying a quenching signal to said first selectively-conductive control element, (c) said first conduction-inducing signal being supplied to said first selectively-conductive control element at the beginnings of half-cycles of a predetermined polarity of said A.C. supply, (d) said second conduction-inducing signal being supplied to said second selectively-conductive control element subsequently during said half-cycles of said predetermined polarity of said A.C. supply, (e) said first selectively-conductive control element receiving said quenching signal from said second selectively-conductive control element later in said half-cycles of said predetermined polarity and said first selectively-conductive control element being adapted to receive said quenching signal from said second selectively-conductive control element before the ends of said half-cycles of said predetermined polarity and said first selectively-conductive control element responding to said quenching signal to become non-conductive, (f) the time interval between the beginnings of said half-cycles of said predetermined polarity of said A.C. supply and said quenching signals being variable to vary the durations of said power pulses, (g) said second selectively-conductive control element supplying said quenching signals to said first selectively-conductive control element at a predetermined, adjustable time during said half-cycle of said predetermined polarity of said A.C. supply, and (h) means to supply the first said conduction-inducing signal to the first said selectively-conductive control element and to supply said second conduction-inducing signal to said second selectively-conductive control element, (i) said control system providing just one power pulse to said load during any given half-cycle of said predetermined polarity of said A.C. supply.

7. A control system that can be connected to an A.C. supply and to a load to provide power pulses for said load and that comprises:

(a) a controlled rectifier that can respond to a signal to become conductive and start supplying a power pulse to said load, (b) a second controlled rectifier that can respond to a second signal to become conductive and start supplying a second power pulse to said load, (c) the first said controlled rectifier responding to inverse current flow therethrough to become non-conductive and thereby terminate the first said power pulse, (d) said second controlled rectifier responding to inverse current flow therethrough to become non-conductive and thereby terminate said second power pulse, (e) a capacitor that can selectively cause inverse current to flow through the first said and said second controlled rectifiers, (f) the first said controlled rectifier receiving the first said signal at the start of positive-going half-cycles of of said A.C. supply, (g) said second controlled rectifier becoming conductive during said positive-going half-cycles of said A.C. supply to enable said capacitor to cause inverse current to flow through the first said controlled rectifier and thereby render the first said controlled rectifier non-conductive and to subsequently enable said capacitor to discharge and then charge in the opposite direction, (h) said second controlled rectifier receiving said second signal at the start of negative-going half-cycles of said A.C. supply, (i) the first said controlled rectifier becoming conductive during said negative-going half-cycles of said A.C. supply to enable said capacitor to cause inverse current to flow through said second controlled rectifier and thereby render said second controlled rectifier non-conductive and to subsequently enable said capacitor to discharge and then charge in its initial direction.

8. A control system that can be connected to an A.C. supply and to a load to provide power pulses for said load and that comprises:

(a) a selectively-conductive control element that can, during a positive-going half-cycle of said A.C. supply, respond to a conduction-inducing signal to become conductive and start supplying a power pulse to said load, (b) said selectively-conductive control element subsequently, during said positive-going half-cycle of said A.C. supply, responding to a quenching signal to become non-conductive and thereby terminate said power pulse, (c) a second selectively-conductive control element that can, during a negative-going half-cycle of said A.C. supply, respond to a conduction-inducing signal to become conductive and start supplying a second power pulse to said load, (d) said second selectively-conductive control element subsequently, during said negative-going half-cycle of said A.C. supply, responding to a quenching signal to become non-conductive and thereby terminate said second power pulse, and (e) means to produce said conduction-inducing and quenching signals, (f) said means producing said conduction-inducing signals adjacent the beginning of the positive-going and negative-going half-cycles of said A.C. supply and being adapted to produce said quenching signals before the ends of said positive-going and negative-going half-cycles of said A.C. supply, (g) said means supplying the first said conduction-inducing signal to the first said selectively-conductive control element at the beginning of said positive-going half-cycle of said A.C. supply and supplying the second said conduction-inducing signal to said second selectively-conductive control element at the beginning of said negative-going half-cycle of said A.C. supply, (h) said means being adapted to vary the time intervals between the beginnings of said positive-going and negative-going half-cycles of said A.C. supply and the production of said quenching signals, (i) whereby the first said selectively-conductive control element can provide a single power pulse of predetermined variable duration during said positive-going half-cycle of said A.C. supply and whereby said second selectively-conductive control element can provide a second power pulse of predetermined variable duration during said negative-going half-cycle of said A.C. supply.

9. A control system that can be connected to an A.C. supply and to a load to provide power pulses for said load and that comprises:

(a) a selectively-conductive control element that can be rendered conductive to start supplying a power pulse to said load, (b) a second selectively-conductive control element that can be rendered conductive to start supplying a second power pulse to said load, (c) a capacitor, (d) said capacitor being adapted to selectively cause inverse current to flow through the first said selectively-conductive control element and thereby render said first said selectively conductive control element non-conductive and to selectively cause inverse current to flow through said second selectively-conductive control element and thereby render said second selectively-conductive control element non-conductive, (e) the first said selectively-conductive control element being rendered conductive to start supplying the first said power pulse to said load at the start of positive-going half-cycles of said A.C. supply, (f) said second selectively-conductive control element becoming conductive during said positive-going half-cycles of said A.C. supply to enable said capacitor to cause inverse current to flow through said first said selectively-conductive control element and thereby render said first said selectively-conductive control element non-conductive and to thereafter enable said capacitor to discharge and then charge in the opposite direction, (g) said second selectively-conductive control element being rendered conductive to start supplying said second power pulse to said load at the start of negative-going half-cycles of said A.C. supply, (h) the first said selectively-conductive control element becoming conductive during said negative-going half-cycles of said A.C. supply to enable said capacitor to cause inverse current to flow through said second selectively-conductive control element and thereby render said second selectively-conductive control element non-conductive and to thereafter enable said capacitor to discharge and then charge in its initial direction, and (i) a signal source that can supply commutating signals to said second selectively-conductive control element during said positive-going half-cycles of said A.C. supply to cause said second selectively-conductive control element to serve as a commutating selectively-conductive control element as by rendering said second selectively-conductive control element conductive and thereby enabling said capacitor to pass inverse current through said first said selectively-conductive control element to render said first said selectively-conductive control element non-conductive and that can supply commutating signals to said first said selectively-conductive control element during said negative-going half-cycles of said A.C. supply to cause said first said selectively-conductive control element to serve as a commutating selectively-conductive control element as by rendering said first said selectively-conductive control element conductive and thereby enabling said capacitor to pass inverse current through said second selectively-conductive control element to render said second selectively-conductive control element non-conductive.

10. A control system that can be connected to an A.C. supply and to a load to provide power pulses for said load and that comprises:

(a) a selectively-conductive control element that can respond to a signal to become conductive and start supplying a power pulse to said load, (b) a second selectively-conductive control element that can respond to a second power signal to become conductive and start supplying a second pulse to said load, (c) the first said selectively-conductive control element responding to inverse current flow therethrough to become non-conductive and thereby terminate the first said power pulse, (d) said second selectively-conductive control element responding to inverse current flow therethrough to become non-conductive and thereby terminate said second power pulse, and (e) a capacitor that can selectively cause inverse current to flow through the first said and said second selectively-conductive control element, (f) the first said selectively-conductive control element receiving the first said signal at the start of positive-going half-cycles of said A.C. supply, (g) said second selectively-conductive control element becoming conductive during said positive-going half-cycles of said A.C. supply to enable said capacitor to cause inverse current to flow through the first said selectively-conductive control element and thereby render the first said selectively-conductive control element non-conductive and to subsequently enable said capacitor to discharge and then charge in the opposite direction, (h) said second selectively-conductive control element receiving said second signal at the start of negative-going half-cycles of said A.C. supply, (i) the first said selectively-conductive control element becoming conductive during said negative-going half-cycles of said A.C. supply to enable said capacitor to cause inverse current to flow through said second selectively-conductive control element and thereby render said second selectively-conductive control element non-conductive and to subsequently enable said capacitor to discharge and then charge in its initial direction.

11. A control system that can be connected to an A.C. supply and to a load to provide power pulses for said load and that comprises:
  (a) a selectively-conductive control element that can respond to a signal at the start of a positive-going half-cycle of the A.C. supply to become conductive and start supplying a power pulse to said load and that can respond to a third signal to become conductive and act as a commutating selectively-conductive control element,
  (b) a second selectively-conductive control element that can respond to a second signal at the start of a negative-going half-cycle of the A.C. supply to become conductive and start supplying a second power pulse to said load and that can respond to a fourth signal to become conductive and act as a commutating selectively-conductive control element,
  (c) the first said selectively-conductive control element responding to inverse current flow therethrough to become non-conductive and thereby terminate the first said power pulse,
  (d) said second selectively-conductive control element responding to inverse current flow therethrough to become non-conductive and thereby terminate said second power pulse, and
  (e) a capacitor that can selectively cause inverse current to flow through the first said and said second selectively-conductive control element,
  (f) the first said selectively-conductive control element responding to the first said signal to start supplying said first power pulse to said load at the start of a positive-going halfcycle of the A.C. source and subsequently responding to said third signal to enable said capacitor to cause inverse current to flow through said second selectively-conductive control element,
  (g) said second selectively-conductive control element responding to said second signal to start supplying said second power pulse to said load at the start of a negative-going half-cycle of the A.C. source and subsequently responding to said fourth signal to enable said capacitor to cause inverse current to flow through said second selectively-conductive control element, and
  (h) means to vary the time interval between the first said and said third signals and to vary the time interval between said second and said fourth signals, whereby the durations of said power pulses can be varied.

12. A control system that can be connected to a source of power and to a load to provide power pulses for said load and that comprises:
  (a) a selectively-conductive control element that can respond to a signal to become conductive and start supplying a power pulse to said load,
  (b) said selectively-conductive control element subsequently responding to a signal to become non-conductive and thereby terminate said power pulse,
  (c) a second selectively-conductive control element that can respond to a signal to become conductive and start supplying a second power pulse to said load,
  (d) said second selectively-conductive control element subsequently responding to a signal to become non-conductive and thereby terminate said second power pulse,
  (e) said control system being adapted, on a recurrent basis, to cause the first said selectively-conductive control element to start supplying a power pulse to said load at the start of a positive-going half-cycle of the A.C. supply to subsequently render said first said selectively-conductive control element non-conductive and thereby terminate said power pulse, to provide a variable time interval between the termination of said power pulse and the initiation of a second power pulse, to cause said second selectively-conductive control element to start supplying said second power pulse to said load at the start of a negative-going half-cycle of the A.C. supply to subsequently render said second selectively-conductive control element non-conductive, and to provide a variable time interval between the termination of said second power pulse and a further power pulse from said first said selectively-conductive control element, and
  (f) a commutating capacitor connected to said selectively-conductive control elements to selectively render those control elements non-conductive,
  (g) the first said selectively-conductive control element being a controlled rectifier,
  (h) said second selectively-conductive control element being a controlled rectifier,
  (i) the first said selectively-conductive control element serving both as a power-supplying and commutating control element,
  (j) said second selectively-conductive control element serving both as a power-supplying and commutating control element,
  (k) said control system being adapted to vary the times when said selectively-conductive control elements are rendered non-conductive to vary the time intervals between the termination of a given power pulse and the succeeding power pulse.

13. A control system that can be connected to an A.C. supply and to a load to provide power pulses for said load and that comprises:
  (a) a controlled rectifier that can respond to a signal to become conductive and start supplying a power pulse to said load,
  (b) a second controlled rectifier that can respond to a second signal to become conductive and start supplying a second power pulse to said load,
  (c) the first said controlled rectifier responding to inverse current flow therethrough to become non-conductive and thereby terminate the first said power pulse,
  (d) said second controlled rectifier responding to inverse current flow therethrough to become non-conductive and thereby terminate said second power pulse,
  (e) a capacitor that can selectively cause inverse current to flow through the first said and said second controlled rectifiers,
  (f) the first said controlled rectifier receiving the first said signal at the start of positive-going half-cycles of said A.C. supply,
  (g) said second controlled rectifier becoming conductive during said positive-going half-cycles of said A.C. supply to enable said capacitor to cause inverse current to flow through the first said controlled rectifier and thereby render the first said controlled rectifier non-conductive and to subsequently enable said capacitor to discharge and then charge in the opposite direction,
  (h) said second controlled rectifier receiving said second signal at the start of negative-going half-cycles of said A.C. supply,
  (i) the first said controlled rectifier becoming conductive during said negative-going half-cycles of said A.C. supply to enable said capacitor to cause inverse current to flow through said second controlled rectifier and thereby render said second controlled rectifier non-conductive and to subsequently enable said capacitor to discharge and then charge in its initial direction,
  (j) a second capacitor,
  (k) said second capacitor being generally in parallel with the first said capacitor to limit the voltage across said first capacitor, (l) said first said capacitor being adapted to render the first said controlled rectifier non-conductive during the same positive-going half-cycle of said A.C. supply in which said first said controlled rectifier is rendered conductive, (m) said first said capacitor being adapted to render said second controlled rectifier non-conductive during the same negative-going half-cycle of said A.C. supply in which said second controlled rectifier is rendered conductive.

14. A control system that can be connected to a source of A.C. power and to a load to provide power pulses for said load and that comprises:

(a) a selectively-conductive control element that can, immediately after the beginning of a positive-going half-cycle of said source of A.C. power, respond to a signal to become conductive and start supplying a power pulse to said load, (b) said selectively-conductive control element subsequently, at a predetermined adjustable point later in said positive-going half-cycle, responding to inverse current flow to become non-conductive and thereby terminate said power pulse, (c) a second selectively-conductive control element that can, immediately after the beginning of a negative-going half-cycle of said source of A.C. power, respond to a signal to become conductive and start supplying a second power pulse to said load, (d) said second selectively-conductive control element subsequently, at a predetermined adjustable point later in said negative-going half-cycle of said source of A.C. power, responding to inverse current flow therethrough to become non-conductive and thereby terminate said second power pulse, (e) said control system being adapted, on a recurrent basis, to cause the first said selectively-conductive control element to start supplying a power pulse to said load at the beginning of a positive-going half-cycle of said source of A.C. power, to subsequently at said predetermined adjustable point later in said positive-going half-cycle of said source of A.C. power render said first said selectively-conductive control element non-conductive and thereby terminate said power pulse to provide an adjustable time interval between the initiation of said power pulse and the termination of said power pulse, and said control system subsequently being adapted to cause said second selectively-conductive control element to start supplying said second power pulse to said load at the beginning of said negative-going half-cycle of said source of A.C. power, to subsequently render said second selectively-conductive control element non-conductive at said predetermined adjustable point later in said negative-going half-cycle of said source of A.C. power, and to provide an adjustable time interval between the initiation of said second power pulse and the termination of said second power pulse, (f) the first said selectively-conductive control element being a controlled rectifier, (g) said second selectively-conductive control element being a controlled rectifier, and (h) a commutating capacitor that helps supply the inverse current flows which render said selectively-conductive control elements non-conductive.

15. A control system that can be connected to a source of A.C. power and to a load to provide power pulses for said load and that comprises:

(a) a selectively-conductive control element that can, immediately after the beginning of a positive-going half-cycle of said source of A.C. power, respond to a signal to become conductive and start supplying a power pulse to said load, (b) said selectively-conductive control element subsequently, at a later point during said postive-going half-cycle of said source of A.C. power, responding to inverse current flow therethrough to become non-conductive and thereby terminate said power pulse, (c) a second selectively-conductive control element that can, immediately after the beginning of a negative-going half-cycle of said source of A.C. power, respond to a signal to become conductive and start supplying a second power pulse to said load.

(d) said second selectively-conductive control element subsequently, at a later point during said negative-going half-cycle of said source of A.C. power, responding to inverse current flow therethrough to become non-conductive and thereby terminate said power pulse, (e) said control system being adapted, on a recurrent basis, to cause the first said selectively-conductive control element to start supplying a power pulse to said load at the beginning of a positive-going half-cycle of said source of A.C. power, to subsequently render said first said selectively-conductive control element non-conductive and thereby terminate said power pulse at said later point during said positive-going half-cycle of said source of A.C. power, to provide an adjustable time interval between the initiation of said power pulse and the termination of said power pulse and said control system subsequently being adapted to cause said second selectively-conductive control element to start supplying said second power pulse to said load at the beginning of a negative-going half-cycle of said source of A.C. power, to subsequently render said second selectively-conductive control element non-conductive at said later point during said negative-going half-cycle of said source of A.C. power, and to provide an adjustable time interval between the initiation of said second power pulse and the termination of said second power pulse, and (f) a capacitor that helps supply the inverse current flow which renders said selectively-conductive control elements non-conductive, (g) said control system being adapted to vary the times when said selectively-conductive control elements are rendered non-conductive so as to vary the time intervals between the initiation and termination of a given power pulse.

16. A control system that can be connected to an A.C. supply and to a load to provide power pulses for said load and that comprises:

(a) a selectively-conductive control element that can respond to a signal to become conductive and start supplying a power pulse to said load and that can respond to a third signal to become conductive and act as a commutating selectively-conductive control element, (b) a second selectively-conductive control element that can respond to a second signal to become conductive and start supplying a second power pulse to said load and that can respond to a fourth signal to become conductive and act as a commutating selectively-conductive control element, (c) the first said selectively-conductive control element responding to inverse current flow therethrough to become non-conductive and thereby terminate the first said power pulse, (d) said second selectively-conductive control element responding to inverse current flow therethrough to become non-conductive and thereby terminate said second power pulse, and (e) a capacitor that can selectively cause inverse current to flow through the first said and said second selectively-conductive control element, (f) the first said selectively-conductive control element responding to the first said signal to start supplying said first power pulse to said load and subsequently responding to said third signal to enable said capacitor to cause inverse current to flow through said second selectively-conductive control element, (g) said second selectively-conductive control element responding to said second signal to start supplying said second power pulse to said load and subsequently responding to said fourth signal to enable said capacitor to cause inverse current to flow through said second selectively-conductive control element, (h) an inductor connected intermediate said selectively-conductive control elements and said load so current passing to said load from said selectively-conductive control elements will pass through said inductor, and (i) a diode that is connected to said inductor to serve as a discharge path for inductive energy in said inductor, (j) said selectively-conductive control elements receiving the first said and said second signals at the beginnings of the half-cycles of said A.C. supply and said selectively-conductive control elements receiving said third and said fourth signals at predetermined adjustable times before the ends of said half-cycles of said A.C. supply, whereby said capacitor is adapted to render said selectively-conductive control elements non-conductive before the ends of the half-cycles of said A.C. supply in which said selectively-conductive control elements are rendered conductive.

17. A control system that can be connected to an A.C. supply and to a load to provide power pulses for said load and that comprises:

(a) a controlled rectifier that can respond to a signal to become conductive and start supplying a power pulse to said load, (b) a second controlled rectifier that can respond to a second signal to become conductive and start supplying a second power pulse to said load, (c) the first said controlled rectifier responding to inverse current flow therethrough to become non-conductive and thereby terminate the first said power pulse, (d) said second controlled rectifier responding to inverse current flow therethrough to become non-conductive and thereby terminate said second power pulse, (e) a capacitor that can selectively cause inverse current to flow through the first said and said second controlled rectifiers, (f) the first said controlled rectifier receiving the first said signal at the start of positive-going half-cycles of said A.C. supply, (g) said second controlled rectifier becoming conductive during said positive-going half-cycles of said A.C. supply to enable said capacitor to cause inverse current to flow through the first said controlled rectifier and thereby render the first said controlled rectifier non-conductive and to subsequently enable said capacitor to discharge and then charge in the opposite direction, (h) said second controlled rectifier receiving said second signal at the start of negative-going half-cycles of said A.C. supply, (i) the first said controlled rectifier becoming conductive during said negative-going half-cycles of said A.C. supply to enable said capacitor to cause inverse current to flow through said second controlled rectifier and thereby render said second controlled rectifier non-conductive and to subsequently enable said capacitor to discharge and then charge in its initial direction, and (j) means including said capacitor to supply the first said and said second signals to the first said and said second controlled rectifiers, (k) said means supplying the first said signal to the first said controlled rectifier immediately after the beginning of a half-cycle of said A.C. supply, (l) said means supplying said second signal to said second controlled rectifier immediately after the beginning of the next-succeeding half-cycle of said A.C. supply.

References Cited
UNITED STATES PATENTS

| | | | |
|---|---|---|---|
| 2,625,676 | 1/1953 | Konick | 323—24 |
| 2,953,735 | 9/1960 | Schmidt | 321—5 |
| 3,019,355 | 1/1962 | Morgan | 307—88.5 |
| 3,040,270 | 6/1962 | Gutzwiller | 323—22 |
| 3,074,008 | 1/1963 | McPhail et al. | 323—22 |
| 3,082,369 | 3/1963 | Landis | 321—45 |
| 3,091,729 | 5/1963 | Schmidt | 321—5 |
| 3,113,241 | 12/1963 | Yonushka | 307—88.5 X |
| 3,120,620 | 2/1964 | Nowell | 307—88.5 |
| 3,133,241 | 5/1964 | White | 321—45 |
| 3,211,985 | 10/1965 | Torok | 323—22 |

JOHN F. COUCH, *Primary Examiner.*

L. McCOLLUM, *Examiner.*

K. HADLAND, H. B. KATZ, K. D. MOORE, W. M. SHOOP, *Assistant Examiners.*